United States Patent
Shim et al.

(10) Patent No.: US 10,194,106 B2
(45) Date of Patent: *Jan. 29, 2019

(54) IMAGE SENSOR AND SENSING METHOD THEREOF

(71) Applicant: DB HiTek Co., Ltd., Seoul (KR)

(72) Inventors: Hee Sung Shim, Gangneung-si (KR); Seong Min Lee, Seongnam-si (KR); Joo Ho Hwang, Seoul (KR)

(73) Assignee: DB Hitek Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/296,079

(22) Filed: Oct. 18, 2016

(65) Prior Publication Data

US 2017/0318246 A1   Nov. 2, 2017

(51) Int. Cl.
| | | |
|---|---|---|
| H04N 5/232 | (2006.01) | |
| H04N 5/345 | (2011.01) | |
| H04N 5/347 | (2011.01) | |
| H04N 5/357 | (2011.01) | |
| H04N 5/365 | (2011.01) | |
| H04N 5/369 | (2011.01) | |
| H04N 5/378 | (2011.01) | |

(52) U.S. Cl.
CPC ....... *H04N 5/3698* (2013.01); *H04N 5/23241* (2013.01); *H04N 5/347* (2013.01); *H04N 5/3454* (2013.01); *H04N 5/3456* (2013.01); *H04N 5/3575* (2013.01); *H04N 5/365* (2013.01); *H04N 5/378* (2013.01)

(58) Field of Classification Search
None
See application file for complete search history.

(56) References Cited

U.S. PATENT DOCUMENTS

| | | | | |
|---|---|---|---|---|
| 2005/0206752 A1* | 9/2005 | Lim | ..... | H04N 5/3575 348/241 |
| 2010/0271522 A1* | 10/2010 | Matsunaga | ..... | H04N 5/2176 348/302 |
| 2011/0267522 A1* | 11/2011 | Gendai | ..... | H04N 5/335 348/308 |
| 2013/0134295 A1* | 5/2013 | Yan | ..... | H04N 5/345 250/208.1 |
| 2015/0326806 A1* | 11/2015 | Moriwaka | ..... | H04N 5/3456 348/302 |
| 2017/0104480 A1* | 4/2017 | Eshel | ..... | H03K 5/1252 |
| 2017/0214877 A1* | 7/2017 | Shim | ..... | H01L 27/14612 |

* cited by examiner

*Primary Examiner* — Twyler L Haskins
*Assistant Examiner* — Quan Pham
(74) *Attorney, Agent, or Firm* — Andrew D. Fortney; Central California IP Group, P.C.

(57) ABSTRACT

An image sensor includes a pixel array including a plurality of unit pixels in a matrix including rows and columns, a selection unit configured to select outputs of some of the columns of the pixel array and output selection output signals, and an analog-digital conversion block including a plurality of analog-digital conversion units corresponding to the columns of the pixel array. First ones of the plurality of analog-digital conversion units include analog-digital conversion blocks configured to convert the selection output signals and output digital data. When the first analog-digital conversion units convert the selection output signals, second ones of the plurality of analog-digital conversion units are turned off.

12 Claims, 18 Drawing Sheets

IMAGE SENSOR AND SENSING METHOD THEREOF

CROSS REFERENCE TO RELATED APPLICATION

This application claims the benefit of Korean Patent Application No. 10-2016-0051338, filed on Apr. 27, 2016, which is hereby incorporated by reference as if fully set forth herein.

BACKGROUND OF THE INVENTION

Field of the Invention

Embodiments of the present invention relate to an image sensor and a sensing method thereof.

Discussion of the Related Art

In an image sensor and, more particularly, a complementary metal-oxide semiconductor (CMOS) image sensor, one frame may include an array of N×M unit pixels.

The image sensor may use a low resolution mode if the data processing speed needs to increase (e.g., a moving image mode). In the low resolution mode, all unit pixels do not output signals, but some unit pixels may output signals. The low resolution mode of the image sensor may be implemented using a subsampling mode and a binning mode.

SUMMARY OF THE INVENTION

Accordingly, embodiments of the present invention are directed to an image sensor capable of reducing power consumption of an analog-digital conversion block and increasing a frame rate.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose(s) of embodiments of the invention, as embodied and broadly described herein, an image sensor may include a pixel array including a plurality of unit pixels in a matrix including rows and columns, a selection unit configured to select outputs of some of the columns of the pixel array and output selection output signals; and an analog-digital conversion block including a plurality of analog-digital conversion units corresponding to the columns of the pixel array, where first analog-digital conversion units of the plurality of analog-digital conversion units include analog-digital conversion blocks configured to convert the selection output signals and output digital data. When the first analog-digital conversion units convert the selection output signals, second ones of the analog-digital conversion units are turned off.

The image sensor may further include a controller configured to select and drive some of the rows of the pixel array.

The image sensor may further include a memory including a plurality of latches configured to store digital data corresponding to the outputs of the analog-digital conversion units.

The image sensor may further include a column scanner configured to select first latches corresponding to the first analog-digital conversion units from among the plurality of latches and read digital data stored in the first latches.

Each of the plurality of analog-digital conversion units may includes a correlated double sampling unit configured to perform correlated double sampling and an analog-digital converter configured to convert an output of the correlated double sampling unit. When the correlated double sampling unit and the analog-digital converter of each of the first analog-digital conversion units are turned on, the correlated double sampling unit and the analog-digital converter of each of the second analog-digital conversion units may be turned off.

According to another aspect of the present invention, an image sensor includes a pixel array including a plurality of unit pixels in a matrix including rows and columns, a controller configured to set a region of interest (ROI) including rows and columns and drive rows of the ROI, a selection unit configured to select outputs corresponding to the columns of the ROI and output selection output signals, an analog-digital conversion block including first analog-digital conversion units configured to convert the selection output signals and at least one second analog-digital conversion unit corresponding to at least one of the columns other than the columns of the ROI, a latch unit including first latches configured to store outputs of the first analog-digital conversion units and second latches configured to store outputs of the second analog-digital conversion units, and a column scanner configured to select the first latches from between the first and second latches and read data stored in the selected first latches.

The pixel array may include a plurality of row zones, each of the plurality of row zones may include two or more different columns, and the columns of the ROI may match at least one columns of the plurality of row zones.

When the first analog-digital conversion units convert the selection output signals, the second analog-digital conversion units may be turned off.

The ROI may comprise or be divided into a plurality of groups, and each of the groups may include two or more different columns. The selection unit may select outputs of the columns in each of the plurality of groups, and output the selection output signals.

Each of the plurality of groups may include two or more adjacent columns among the columns of the ROI.

The plurality of groups may include first groups and second groups, and each of the first groups may include two or more adjacent odd-numbered columns and each of the second groups may include two or more adjacent even-numbered columns.

The pixel array may include sensing lines connected to the selection unit, and each of the sensing lines may be connected to unit pixels in a corresponding one of the columns of the pixel array.

The selection unit may include first switches configured to connect sensing lines corresponding to columns in each of the plurality of groups and second switches connected between the sensing lines and the analog-digital conversion units.

The selection unit may further include third switches connected between connection nodes that may be between the sensing lines, the analog-digital conversion units, and/or a ground voltage or a ground potential.

According to another aspect of the present invention, a method of sensing an image sensor including a pixel array including a plurality of unit pixels in a matrix including rows and columns and a plurality of analog-digital conversion units includes driving the rows of a region of interest (ROI)

defined by rows and columns of the pixel array, selecting only the columns of the ROI and outputting selection output signals, converting the selection output signals using first analog-digital conversion units corresponding to the selection output signals and outputting digital data, and reading the digital data. When the first analog-digital conversion units convert an analog signal to a digital signal, second analog-digital conversion units of the analog-digital conversion units may be turned off.

According to embodiments of the present invention, it is possible to reduce power consumption of the analog-digital conversion block and to increase a frame rate of the image sensor.

It is to be understood that both the foregoing general description and the following detailed description of various embodiments are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION OF THE INVENTION

Figure 1:
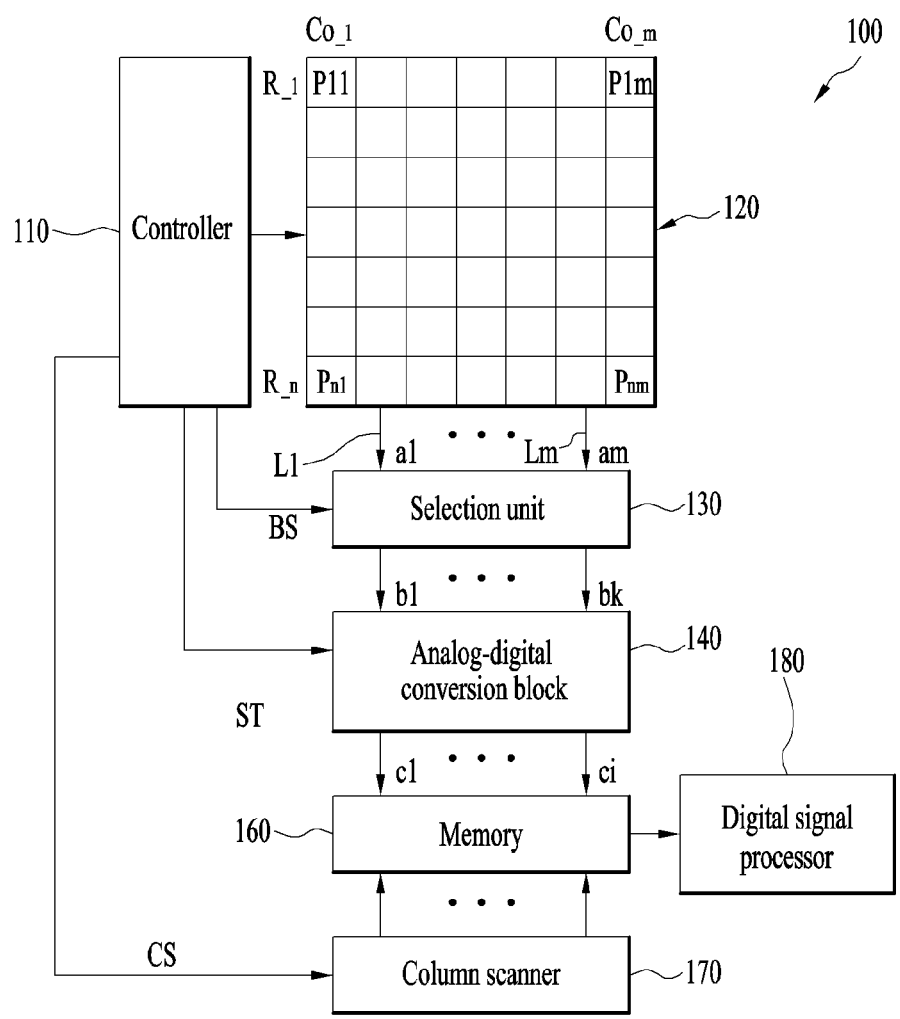
FIG. 1 is diagram showing the configuration of an image sensor according to an embodiment of the present invention.

Hereinafter, embodiments of the present invention will be clearly appreciated through the accompanying drawings and the following description thereof. In description of various embodiments, it will be understood that, when an element such as a layer, film, region, pattern or structure is referred to as being formed "on" or "under" another element, such as a substrate, layer, film, region, pad or pattern, it can be directly "on" or "under" the other element or be indirectly "on" or "under" the other element with intervening elements therebetween. It will also be understood that "on" and "under" the element is described relative to the drawings. In addition, the same reference numerals designate the same constituent elements throughout the description of the drawings.

Figure 2:
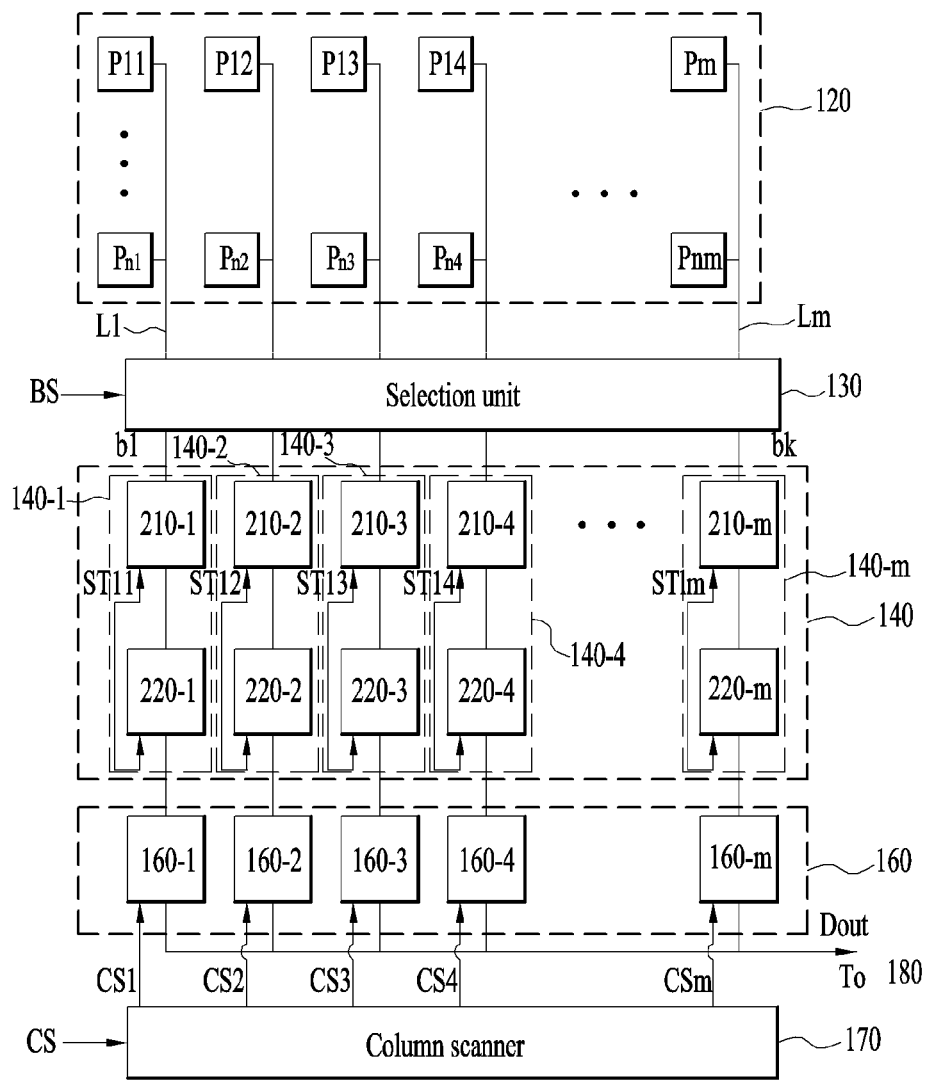
FIG. 2 is a diagram showing an embodiment of a pixel array, an analog-digital conversion block and a memory as shown in FIG. 1.

FIG. 1 is diagram showing a configuration of an image sensor 100 according to an embodiment of the present invention, and FIG. 2 is a diagram showing an embodiment of a pixel array 120, an analog-digital conversion block 140 and a memory 160 as shown in FIG. 1.

Referring to FIGS. 1 and 2, the image sensor 100 includes a controller 110, a pixel array 120, a selection unit 130, an analog-digital conversion block 140, a memory 160 and a column scanner 170. In addition, the image sensor 100 may further include a digital signal processor 180.

The controller 110 outputs one or more first control signals (e.g., a reset signal RX, a transmission signal TX, and/or a selection signal SX) configured to control the pixel array 120, a second control signal BS configured to control the selection unit 130, a third control signal ST configured to control the analog-digital conversion block 140 and a fourth signal CS configured to control the column scanner 170.

For example, the controller 110 may include a timing controller configured to generate a timing signal or a control signal and a row driver configured to generate a first control signal that drives a plurality of unit pixels based on the timing signal from the timing controller.

The pixel array 120 may include a plurality of unit pixels P11 to Pnm (n and m being natural numbers greater than 1), and the plurality of unit pixels P11 to Pnm may be arranged in a matrix including rows $R\_1$ to $R\_n$ (n being a natural number greater than 1) and columns $C_{o\_1}$ to $C_{o\_m}$. Each of the unit pixels P11 to Pnm may be a photoelectric transformation element configured to sense light and transform the sensed light into an electric signal.

The pixel array 120 may include sensing lines L1 to Lm (m being a natural number greater than 1) connected to the unit pixels and output sensing signals a1 to am (m being a natural number greater than 1) through the sensing lines L1 to Lm. For example, each of the sensing lines L1 to Lm may be connected to each of the output terminals of the unit pixels connected to a corresponding one of columns.

The selection unit 130 selects at least one of columns $C_{o\_1}$ to $C_{o\_m}$ of the pixel array 120 and outputs the outputs of the unit pixels in the at least selected one column, based on the second control signal BS.

For example, the selection unit 130 may receive the outputs of the unit pixels in the selected columns and output selection output signals b1 to bk ($1 \leq k \leq m$). The selection output signals b1 to bk ($1 \leq k \leq m$) may be a sum or an average of the outputs of the two or more selected unit pixels, without being limited thereto.

For example, the selection unit 130 may select outputs of the unit pixels in two or more different columns and output selection output signals b1 to bk ($1 \leq k \leq m$).

The unit pixels in two or more different columns may have identical exposure times. Here, an "exposure time" may be a period from the end of a reset operation in a photodiode of a unit pixel to the transmission of charges from the photodiode of the unit pixel to a floating diffusion area of the unit pixel.

For example, the selection unit 130 may select outputs of two or more sensing lines from among the sensing lines L1 to Lm and output the selection output signals b1 to bk.

The unit pixels may comprise or be divided into a plurality of groups, and each of the plurality of groups may include two or more different columns. The columns in each group may not overlap each other.

For example, each of the plurality of groups may include two or more adjacent columns. Alternatively, for example, each of the plurality of groups may include first groups and second groups.

Each first group may include two or more adjacent odd-numbered columns, and each second group may include two or more adjacent even-numbered columns.

The analog-digital conversion block 140 converts the analog selection output signals b1 to bk from the selection unit 130 and outputs digital signals C1 to Ci (i being a natural number greater than 1), based on the selection signal ST.

The analog-digital conversion block 140 may include a plurality of analog-digital conversion units 140-1 to 140-m.

The plurality of analog-digital conversion units 140-1 to 140-m may include correlated double sampling units 210-1 to 210-m configured to perform correlated double sampling in order to cancel unique fixed pattern noise of pixels, and analog-digital converters 220-1 to 220-m configured to convert the outputs of the correlated double sampling units 210-1 to 210-m.

The plurality of analog-digital conversion units 140-1 to 140-m may correspond to the sensing lines L1 to Lm. For example, each of the plurality of analog-digital conversion units 140-1 to 140-m may correspond to one (e.g., a unique or corresponding one) of the sensing lines L1 to Lm.

The selection output signals b1 to bk may be selectively provided to k ($1 \leq k \leq m$) analog-digital conversion units from among the m analog-digital conversion units 140-1 to 140-m.

The controller 110 may output selection signals ST11 to ST1m configured to control the plurality of analog-digital conversion units 140-1 to 140-m.

The plurality of analog-digital conversion units 140-1 to 140-m may selectively operate in response to the selection signals ST11 to ST1m. For example, based on the selection signals ST11 to ST1m, the first analog-digital conversion units may be turned on, and the second analog-digital conversion units may be turned off.

When the first analog-digital conversion units convert the selection output signals b1 to bk, the second analog-digital conversion units may be turned off.

For example, based on the selection signals ST11 to ST1m, an operating voltage may be supplied to the first analog-digital conversion units to turn the first analog-digital conversion units on, and the operating voltage may not be supplied to the second analog-digital conversion units to turn the second analog-digital conversion units off.

Here, the first analog-digital conversion units are analog-digital conversion units 140-1 to 140-m to which the selection output signals b1 to bk are supplied, and the second analog-digital conversion units may be analog-digital conversion units 140-1 to 140-m to which the selection output signals b1 to bk are not supplied.

Accordingly, the first analog-digital conversion units may output the digital signals C1 to Ci obtained by converting the selection output signals.

Since all m analog-digital conversion units 140-1 to 140-m do not operate, and only the first analog-digital conversion units to which the selection output signals b1 to bk are supplied operate, embodiments of the present invention can reduce power consumption of the analog-digital conversion block.

The memory 160 stores outputs of the analog-digital conversion units 140-1 to 140-m and reads and/or outputs only the digital signals C1 to Ci from the analog-digital conversion units 140-1 to 140-m to the digital signal processor 180 in response to the control signals CS1 to CSm of the column scanner 170.

The memory 160 may include a plurality of latches 160-1 to 160-m or a plurality of capacitors (e.g., one transistor-one capacitor random access memory cells such as are typically found in dynamic random access memories). The plurality of latches 160-1 to 160-m or the plurality of capacitors corresponds to the plurality of analog-digital conversion units 140-1 to 140-m.

For example, each of the plurality of latches 160-1 to 16-m may store a corresponding one of the outputs of the plurality of analog-digital conversion units 140-1 to 140-m.

In addition, for example, first latches of the plurality of latches 160-1 to 160-m may correspond to the first analog-digital conversion units, and second latches of the plurality of latches 160-1 to 160-m may correspond to the second analog-digital conversion units.

The column scanner 170 may output control signals CS1 to CSm configured to control the memory 160 based on the fourth control signal CS received from the controller 110.

The column scanner 170 may generate the control signals CS1 to CSm configured to select and/or read only the first latches storing the digital signals C1 to Ci.

The first latches storing the digital signals C1 to Ci may be selected from among the plurality of latches 160-1 to 160-m of the memory 160 by the first control signals CS1 to CSm, and data stored in the first latches may be sequentially read in response to a clock signal CLK (see FIG. 7) received from the controller 110 and transmitted to the digital signal processor 180.

Since the column scanner 170 does not read all of the data stored in the plurality of latches 160-1 to 160-m of the memory 16, and sequentially reads only the digital signals C1 to Ci stored in the first latches, embodiments of the present invention can improve the read speed of the data stored in the memory 160, and thus can shorten the time to scan one row of the pixel array 120.

Figure 5:
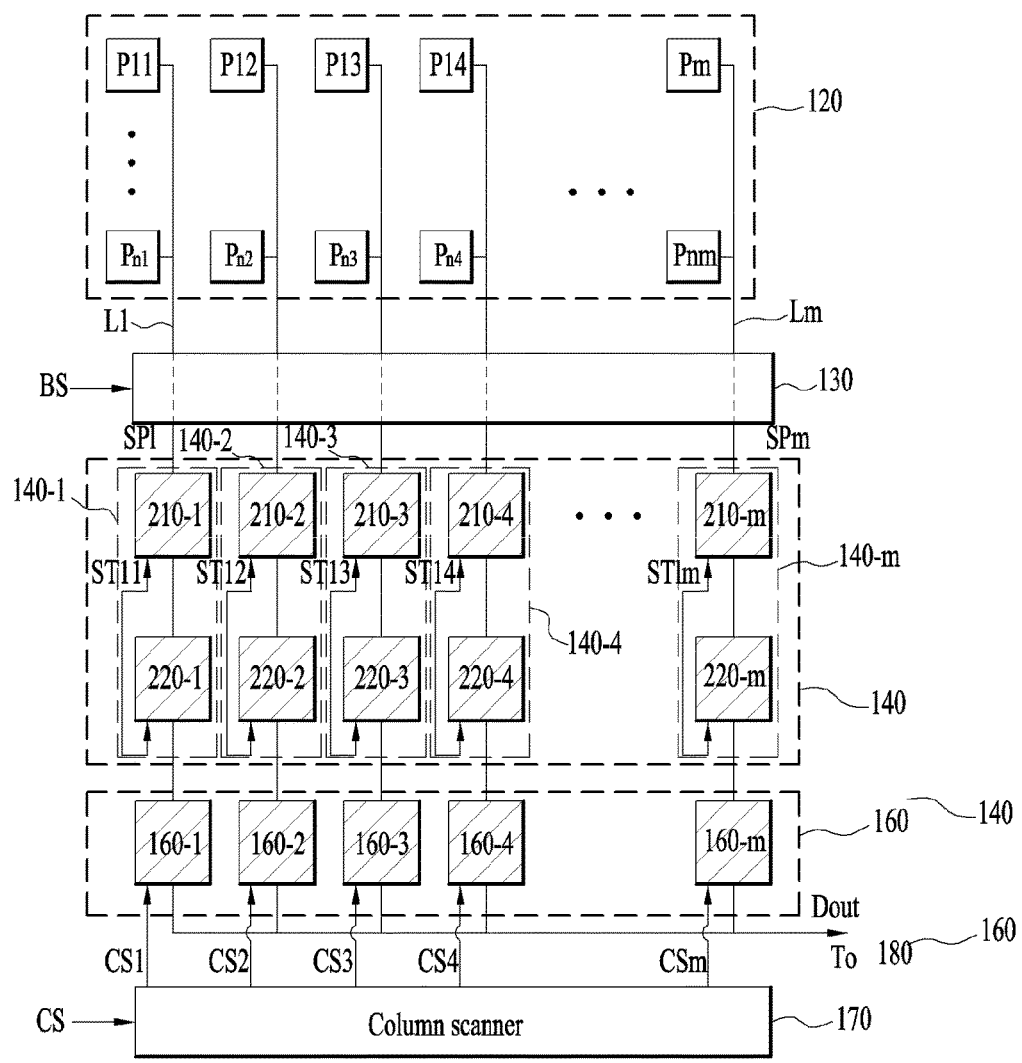
FIG. 5 is a diagram showing an operation according to another embodiment of the image sensor shown in FIG. 1.

In operation shown in FIG. 5, the column scanner 170 may select all of the plurality of latches 160-1 to 160-m and read the data stored in the plurality of latches 160-1 to 160-m.

The digital signal processor 180 processes digital signals C1 to Ci received from the memory 160.

Figure 3:
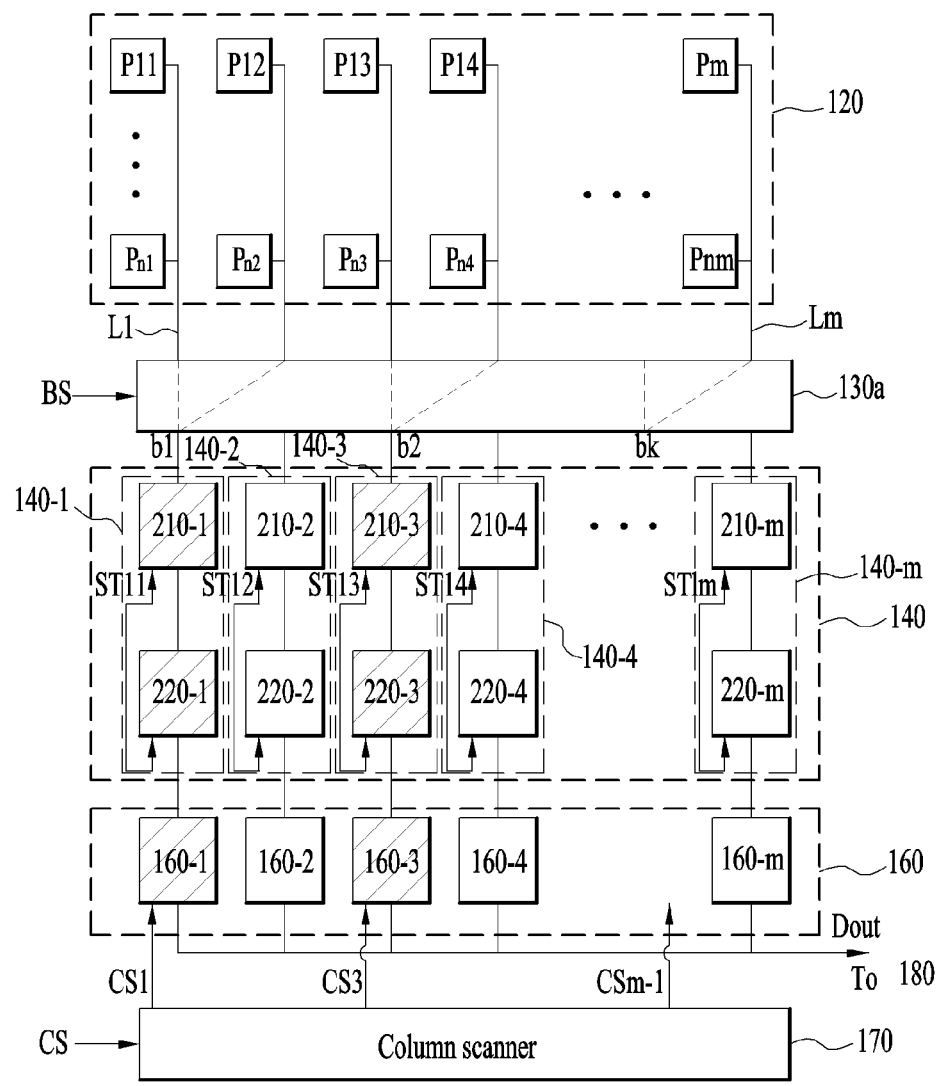
FIG. 3 is a diagram showing an operation according to an embodiment of the image sensor shown in FIG. 1.

FIG. 3 is a diagram showing an operation according to an embodiment of the image sensor shown in FIG. 1.

The same reference numerals as in FIG. 2 indicate the same components, which will be described briefly or omitted.

For example, the embodiment of FIG. 3 relates to a monochrome type image sensor for sensing a grayscale image.

Referring to FIG. 3, the selection unit 130a may select outputs of the unit pixels in two adjacent columns and output selection output signals b1 to bk ($1 \leq k \leq m$), based on the second control signal BS.

For example, the selection unit 130a may include a plurality of switches and a plurality of capacitors, and the second control signal BS may be a signal configured to control the plurality of switches. In addition, the selection unit 130a may further include at least one resistor.

The selection output signals b1 to bk ($1 \leq k \leq m$) are provided to first analog-digital conversion units 140-1 to 140-(m−1). For example, the first analog-digital conversion units may be odd-numbered analog-digital conversion units corresponding to the odd-numbered sensing lines, without being limited thereto.

Based on the selection signals ST11 to S1im, a voltage is supplied to the first analog-digital conversion units 140-1 to 140-(m−1) such that the first analog-digital conversion units 140-1 to 140-(m−1) are turned on, whereas the voltage is not supplied to the remaining analog-digital conversion units 140-2 to 140-m to turn off the remaining analog-digital conversion units 140-2 to 140-m.

Alternatively, based on the selection signals ST11 to ST1m, a bias current may be supplied to first analog-digital conversion units 140-1 to 140-(m−1) such that the first analog-digital conversion units 140-1 to 140-(m−1) are turned on, whereas the bias current is not supplied to the remaining analog-digital conversion units 140-2 to 140-m to turn off the remaining analog-digital conversion units 140-2 to 140-m.

For example, based on the selection signals ST11 to ST1m, the first correlated double sampling units 210-1 to 210-(m−1) and the first analog-digital conversion units 220-1 to 220-(m−1) of the first analog-digital conversion units 140-1 to 140-(m−1) may all be turned on, and the second correlated double sampling units 210-2 to 210-m and the second analog-digital conversion units 220-2 to 220-m of the second analog-digital conversion units 140-2 to 140-m may all be turned off. Therefore, according to one or more embodiments of the present invention, it is possible to reduce power consumption in the image sensor.

The outputs of the first analog-digital conversion units 140-1 to 140-(m−1) may be stored in first latches 160-1 to 160-(m−1) corresponding to the first analog-digital conversion units 140-1 to 140-(m−1).

The column scanner 170 may generate scan signals CS1 to CS-(m−1) configured to select the first latches to be read from among the latches 160-1 to 160-m of the memory 160, based on the fourth control signal CS.

In response to the scan signals CS1 to CS-(m−1), data stored in the first latches 160-1 to 160-(m−1) of the memory 160 may be sequentially read.

Figure 7:
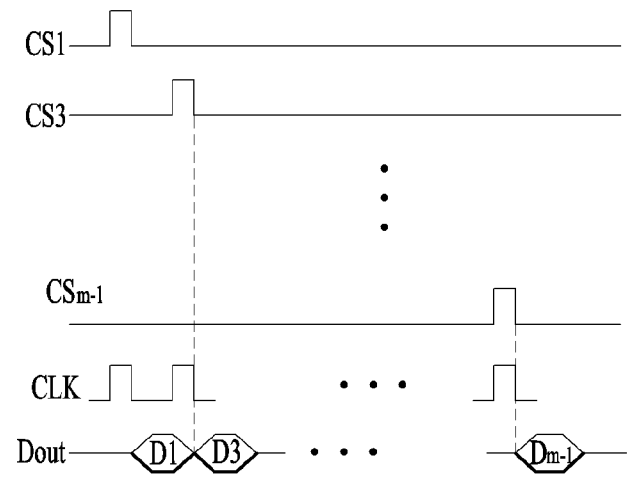
FIG. 7 is a timing diagram of scan signals generated by a column scanner as shown in FIG. 3.

FIG. 7 is a timing diagram of scan signals CS1 to CS-(m−1) generated by a column scanner 170 as shown in FIG. 3.

Referring to FIG. 7, the column scanner 170 may generate scan signals CS1 to CSm-1 configured to read the data stored in first latches 160-1 to 160-(m−1) (e.g., odd-numbered latches) in response to a clock signal CLK. In response to the scan signals CS1 to CSm-1, data D1 to Dm-1 stored in the first latches are sequentially transmitted to the digital signal processor 180 and, when such data transmission is completed, the scan of one row of the pixel array 120 may be completed.

Since only the data stored in the odd-numbered latches of the memory 160 corresponding to one row of the pixel array 120 is read, it is possible to halve the time to scan one row and to increase the frame rate of the image sensor.

Figure 4:
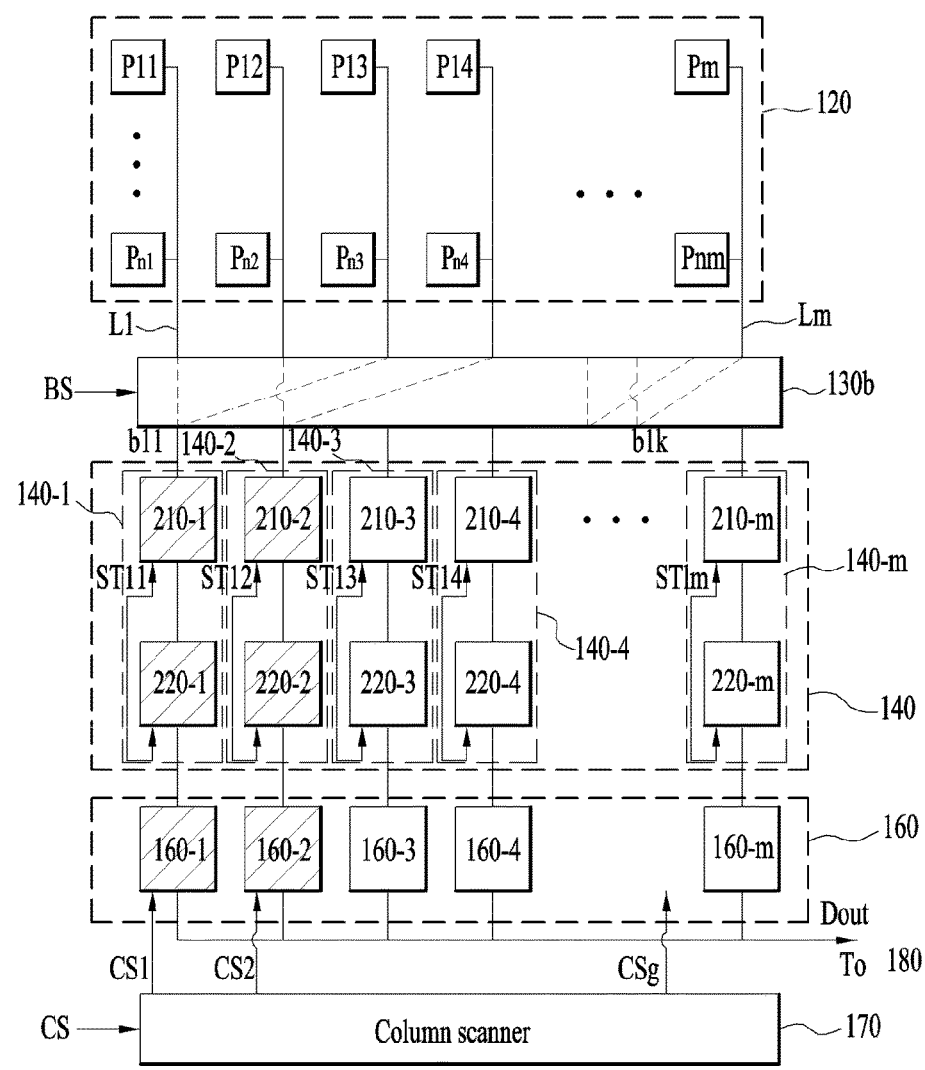
FIG. 4 is a diagram showing an operation according to another embodiment of the image sensor shown in FIG. 1.

FIG. 4 is a diagram showing an operation according to another embodiment of the image sensor shown in FIG. 1.

The same reference numerals as in FIG. 2 indicate the same components, which will be described briefly or omitted.

For example, the embodiment of FIG. 4 relates to a Bayer type image sensor for sensing a color (e.g., RGB color) image.

Referring to FIG. 4, the selection unit 130b may select outputs of unit pixels in two adjacent odd-numbered columns among the odd-numbered columns of the pixel array 120, output first selection output signals b11 to b1 (k−1), select outputs of unit pixels in two adjacent even-numbered columns among the even-numbered columns of the pixel array 120, and output first selection output signals b12 to b1k ($1 \leq k \leq m$), based on the second control signal BS.

The selection output signals b11 to b1k ($1 \leq k \leq m$) may be supplied to first analog-digital conversion units 140-1, 140-2, 140-5, 140-6 . . . among the plurality of analog-digital conversion units 140-1 to 140-m, without being limited thereto.

Based on the selection signals ST11 to ST1m, a voltage is supplied to the first analog-digital conversion units 140-1, 140-2, 140-5, 140-6 . . . such that the first analog-digital conversion units 140-1, 140-2, 140-5, 140-6 . . . are turned on, whereas the voltage is not supplied to the remaining analog-digital conversion units other than the first analog-digital conversion units 140-1, 140-2, 140-5, 140-6 . . . such that the remaining analog-digital conversion units are turned off. Therefore, according to embodiments of the present invention, it is possible to reduce power consumption in the analog-digital conversion block 140.

The outputs of the first analog-digital conversion units 140-1, 140-2, 140-5, 140-6 . . . may be stored in first latches 160-1, 160-2, 160-5, 160-6 . . . corresponding to the first analog-digital conversion units 140-1, 140-2, 140-5, 140-6 . . . among the latches 160-1 to 160-m of the memory 160.

Figure 8:
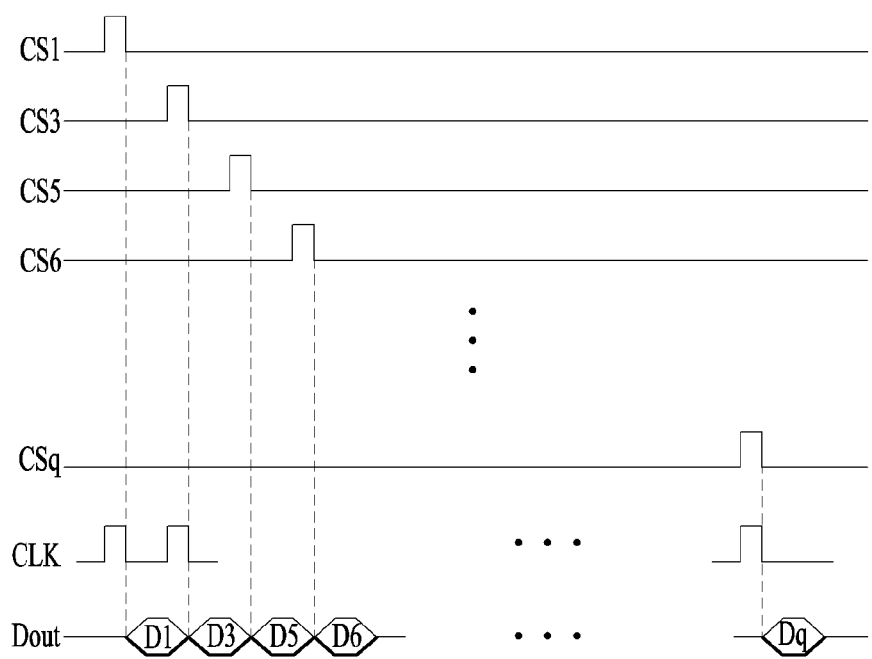
FIG. 8 is a timing diagram of scan signals generated by a column scanner as shown in FIG. 4.

FIG. 8 is a timing diagram of scan signals generated by a column scanner 170 as shown in FIG. 4.

Referring to FIG. 8, the column scanner 170 may generate scan signals CS1, CS2, CS5, CS6 . . . , and CSq configured to read the data stored in first latches 160-1, 160-2, 160-5, 160-6 . . . in response to a clock signal CLK.

In response to the scan signals CS1, CS2, CS5, CS6 . . . CSq, data D1, D2, D5, D6 . . . Dq stored in the first latches 160-1, 160-2, 160-5, 160-6 . . . are sequentially transmitted to the digital signal processor 180, and when such data transmission is completed, a scan of one row of the pixel array 120 may be completed.

Since only the data stored in the first latches 160-1, 160-2, 160-5, 160-6 . . . among the latches of the memory 160 corresponding to one row of the pixel array 120 is read, it is possible to halve time to scan one row and to increase a frame rate of the image sensor.

The selection unit 130 shown in FIG. 2 may output the outputs of the unit pixels in each column of the pixel array 120 to the analog-digital conversion units corresponding to each column. In this case, it is possible to perform normal mode operation without performing a horizontal binning operation by the selection unit 130.

FIG. 5 is a diagram showing an operation according to another embodiment of the image sensor shown in FIG. 1.

Referring to FIG. 5, the selection unit 130c selects the outputs of the unit pixels in each column of the pixel array 120 and outputs selection signals SP1 to SPm, based on a second control signal BS. FIG. 5 shows a normal operation of the image sensor without a binning operation.

Each of the plurality of analog-digital conversion units 140-1 to 140-m converts a corresponding one of the selection signals SP1 to SPm and outputs the converted signal.

The plurality of latches 160 stores a corresponding one of the outputs of the plurality of analog-digital conversion units 140-1 to 140-m.

The column scanner 170 reads the data stored in the plurality of latches 160 and transmits the read data to the digital signal processor 180.

Figure 6:
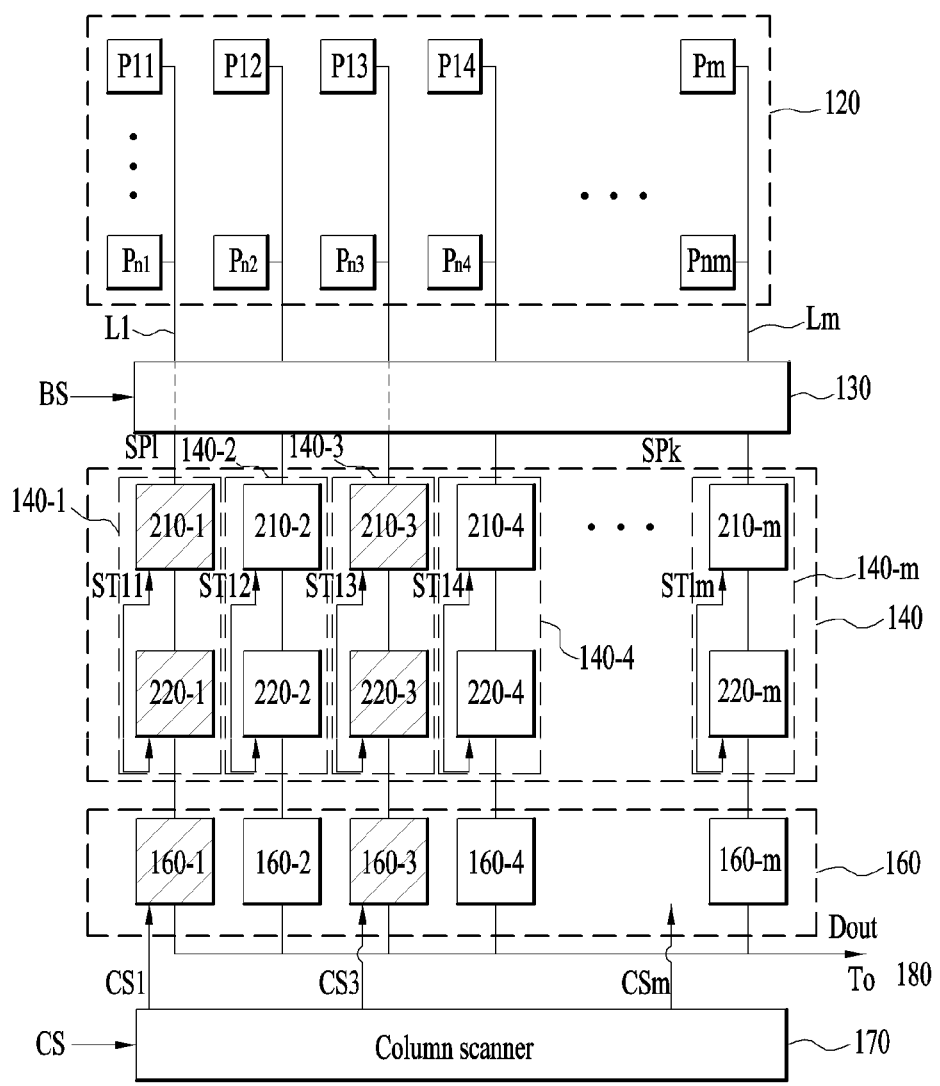
FIG. 6 is a diagram showing an operation according to another embodiment of the image sensor shown in FIG. 1.

FIG. 6 is a diagram showing an operation according to another embodiment of the image sensor shown in FIG. 1.

Referring to FIG. 6, the selection unit 130d selects the outputs of the unit pixels in odd-numbered or even-numbered columns of the pixel array 120, and outputs selection signals SP1 to SPk based on the second signal BS. FIG. 5 shows a skipping operation.

The odd-numbered or even-numbered analog-digital conversion units of the plurality of analog-digital conversion units 140-1 to 140-m convert a corresponding one of the selection signals SP1 to SPk and output the converted signal.

The odd-numbered or even-numbered latches of the plurality of latches store the outputs of the odd-numbered or even-numbered analog-digital conversion units.

The column scanner 170 reads the data stored in the odd-numbered or even-numbered latches 160 and transmits the data to the digital signal processor 180.

The selection unit 130 may include first switches configured to connect the sensing lines corresponding to the columns in the plurality of groups and second switches connected between the sensing lines and the analog-digital conversion units.

In addition, the selection unit 130 may further include third switches between a ground voltage or ground potential and the connection nodes between the sensing lines and the analog-digital conversion units.

Figure 9A:
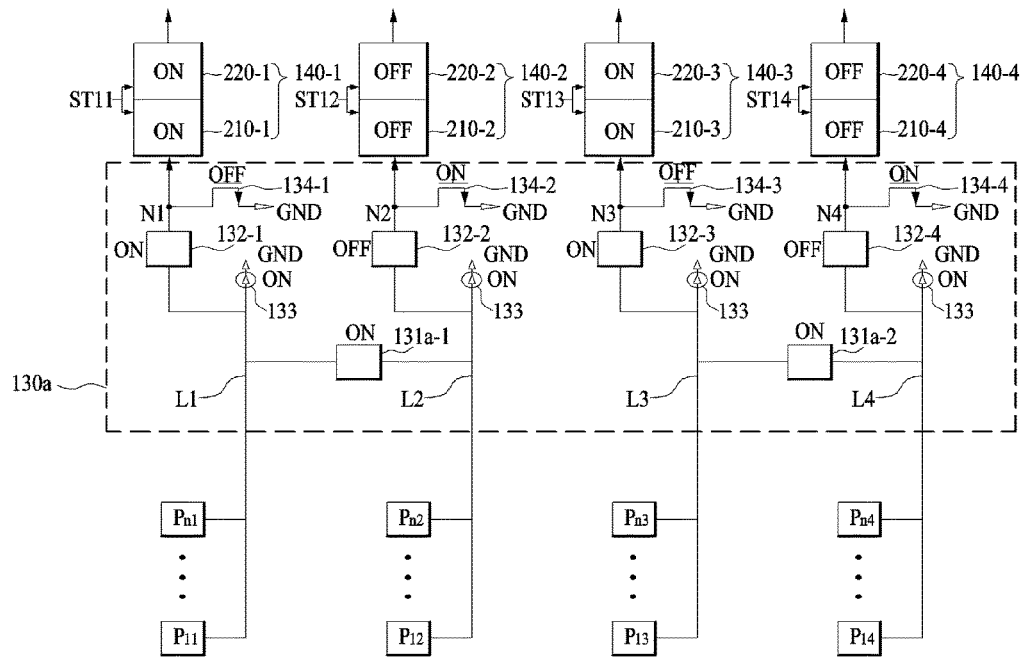
FIG. 9A is a diagram showing ON and/or OFF states of first to third switches and ON and/or OFF states of analog-digital conversion units according to a first operation of a selection unit as shown in FIG. 3.

FIG. 9A is a diagram showing an embodiment of a selection unit 130a suitable for use in the embodiment of FIG. 3.

Referring to FIG. 9A, the selection unit 130a may include first switches 131a-1 to 131a-j (j being a natural number greater than 1) between two adjacent sensing lines L1 and L2, L3 and L4, Lm-1 and Lm, second switches 132-1 to 132-m between the sensing lines L1 to Lm and the analog digital conversion units 140-1 to 140-m, third switches 134-1 to 134-m between the connection nodes N1 to Nm (i.e., between the sensing lines L1 to Lm and the analog-digital conversion units 140-1 to 140-m) and a ground voltage or a ground potential GND, and a constant current source 133 between the sensing lines L1 to Lm and the ground voltage or potential GND.

For example, each of the first switches 131a-1 to 131a-j (j being a natural number greater than 1) may be between two different and/or adjacent sensing lines (e.g., L1 and L2, L3 and L4 . . . Lm-1 and Lm) among the sensing lines L1 to Lm.

For example, each of the second switches 132-1 to 132-m may be between a corresponding one of the sensing lines L1 to Lm and a corresponding one of the analog-digital conversion units 140-1 to 140-m (e.g., between sensing line L1 and analog-digital conversion unit 140-1, sensing line L2 and analog-digital conversion unit 140-2, etc.).

For example, each of the third switches 134-1 to 134-m may be between one of the connection nodes N1 to Nm and the ground voltage or potential GND.

For example, the constant current source 133 may be between the sensing lines L1 to Lm and the ground voltage or potential GND.

FIG. 9A shows the ON and OFF states of the first to third switches and the ON and OFF states of the analog-digital conversion units 140-1 to 140-m according to a first process or operation of the selection unit 130a of FIG. 3. The first process or operation of the selection unit 130a may be a horizontal binning operation.

Upon the horizontal binning process or operation, the third switches 134-1 to 134m-1 connected to the turned-on analog-digital conversion units 140-1 to 140-m-1 are turned off, but the third switches 134-2 to 134-m connected to the turned-off analog-digital conversion units 140-2 to 140-m are turned on, in order to prevent current leakage.

Figure 9B:
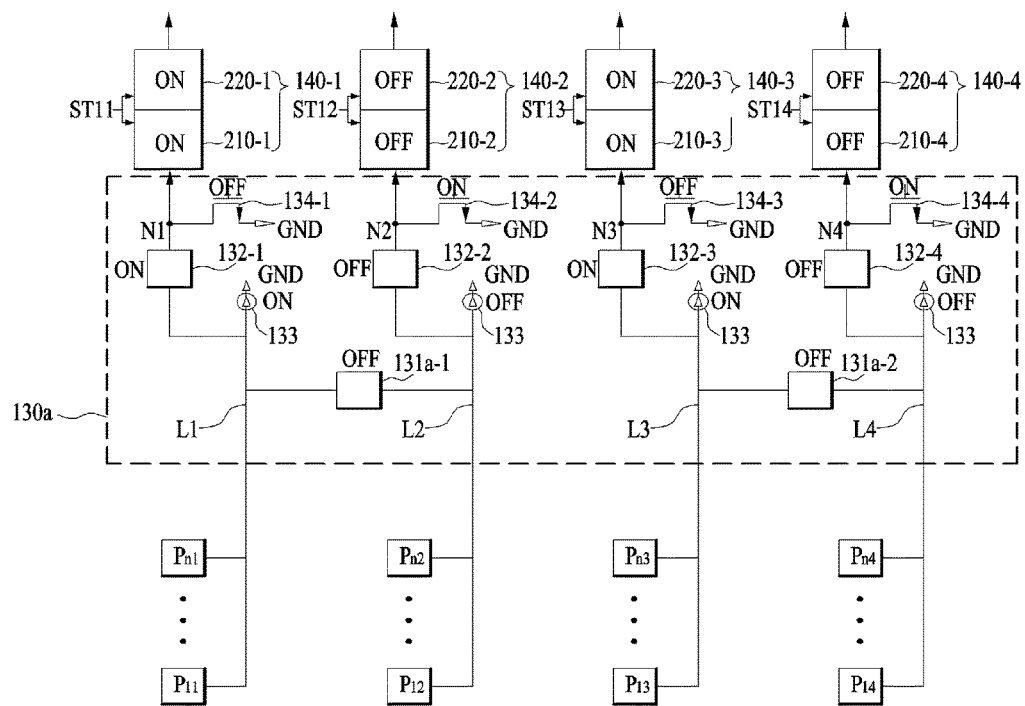
FIG. 9B is a diagram showing ON and/or OFF states of first to third switches and ON and/or OFF states of analog-digital conversion units according to a second operation of a selection unit as shown in FIG. 3.

FIG. 9B is a diagram showing the ON and/or OFF states of the first to third switches and the ON and/or OFF state(s) of analog-digital conversion units 140-1 to 140-m according to a second process or operation of the selection unit 130a of FIG. 3. Here, the second process or operation of the selection unit 130a may be a skipping operation that senses only the odd-numbered or even-numbered columns of the pixel array 120.

The constant current source 133 connected to the turned-off second switches 132-2 to 132-m are turned off. According to embodiments of the image sensor, it is possible to reduce power consumption.

In contrast, in order to sense only the odd-numbered columns, a process or operation opposite to the process or operation that turns on or off the second and third switches, the constant current source and the analog-digital conversion units as shown in FIG. 9B may be performed.

In addition, the first switches 131a-1 to 131a-j may all be turned off, the second switches 132-1 to 132-m may all be turned on, the third switches 134-1 to 134-m may all be turned off, the constant current source 133 may be turned on, and the analog-digital conversion units may all be turned on, so that the selection unit 130a may perform a normal process or operation.

Figure 10A:
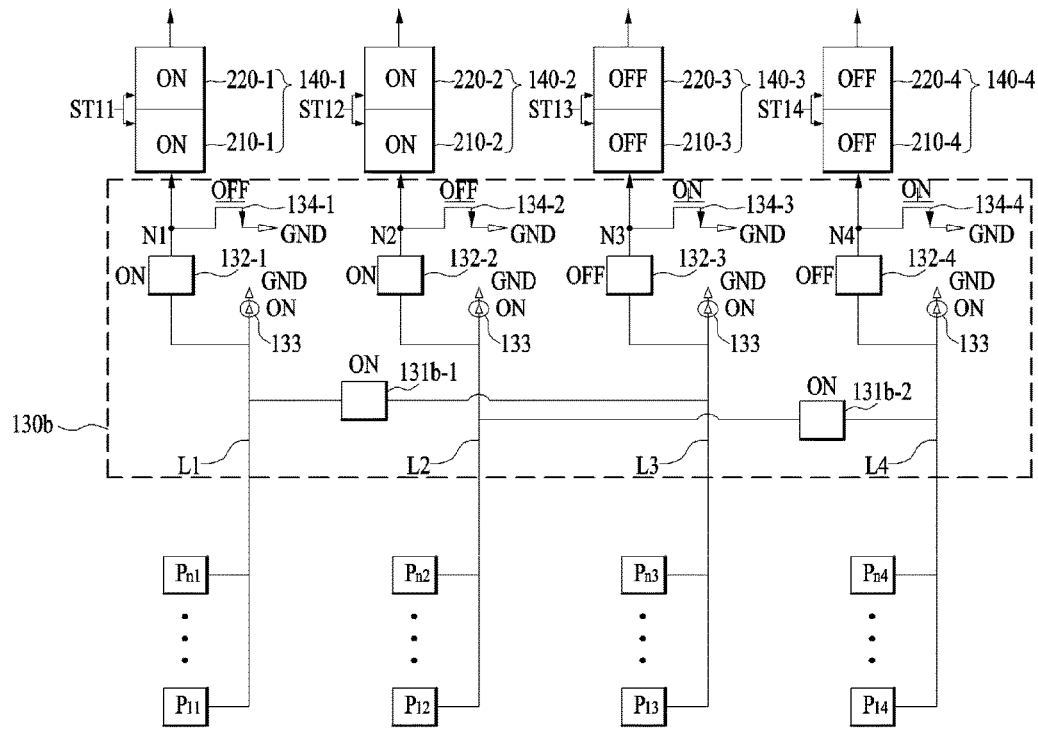
FIG. 10A is a diagram showing ON and/or OFF states of first to third switches and ON and/or OFF states of analog-digital conversion units according to a first operation of a selection unit as shown in FIG. 4.

FIG. 10A is a diagram showing the ON and/or OFF states of the first to third switches and the ON and/or OFF states of the analog-digital conversion units 140-1 to 140-m according to a first process or operation of the selection unit 130b in FIG. 4. The same reference numerals as in FIG. 9A indicate the same components in FIG. 10A, which will be described briefly or omitted. The first process or operation of the selection unit 130b may be a horizontal binning process or operation.

The selection unit 130b may include first switches 131b-1 to 131b-j (j being a natural number greater than 1), second switches 132-1 to 132-m, a constant current source 133, and third switches 134-1 to 134-m.

Each of the first switches 131b-1 to 131b-j (j being a natural number greater than 1) are between two adjacent odd-numbered sensing lines or between two adjacent even-numbered sensing lines.

The description of the ON and OFF states of the first to third switches, the constant current source and the analog-digital conversion units as described with reference to FIG. 9A is equally applicable to the first process or operation of the selection unit 130b.

Figure 10B:
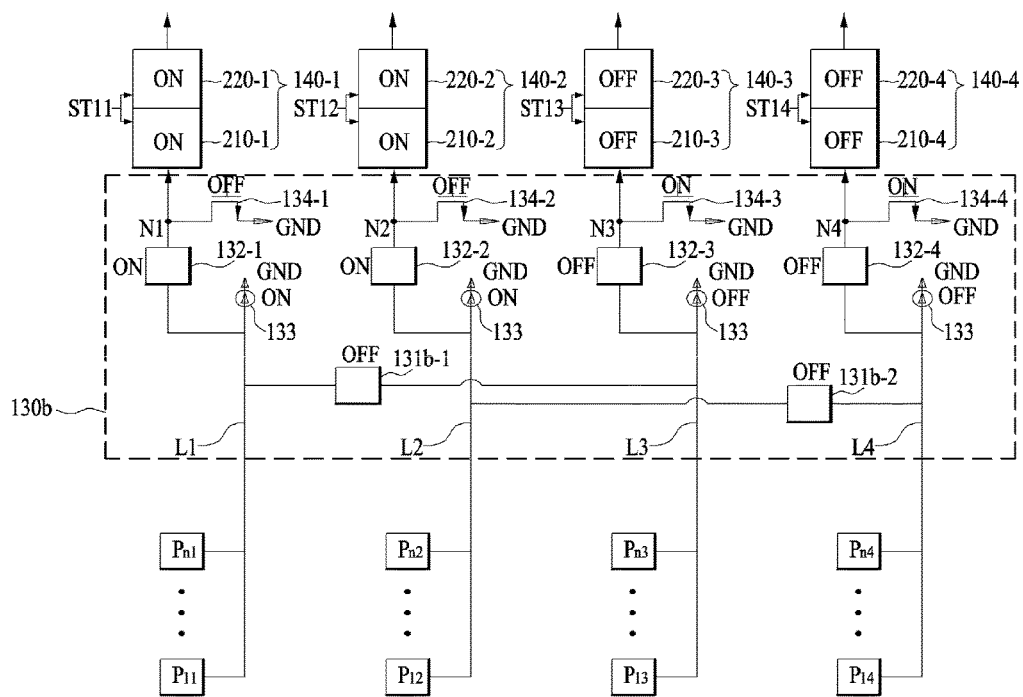
FIG. 10B is a diagram showing ON and/or OFF states of first to third switches and ON and/or OFF states of analog-digital conversion units according to a second operation of a selection unit as shown in FIG. 4.

FIG. 10B is a diagram showing the ON and/or OFF states of the first to third switches and the ON and/or OFF states of the analog-digital conversion units 140-1 to 140-m according to a second process or operation of the selection unit 130b in FIG. 4. The second process or operation of the selection unit 130b may be a skipping process or operation.

The description of the ON and/or OFF states of the first to third switches, the constant current source and the analog-digital conversion units as described with reference to FIG. 9B is equally applicable to the normal process or operation of the selection unit 130b.

Figure 11:
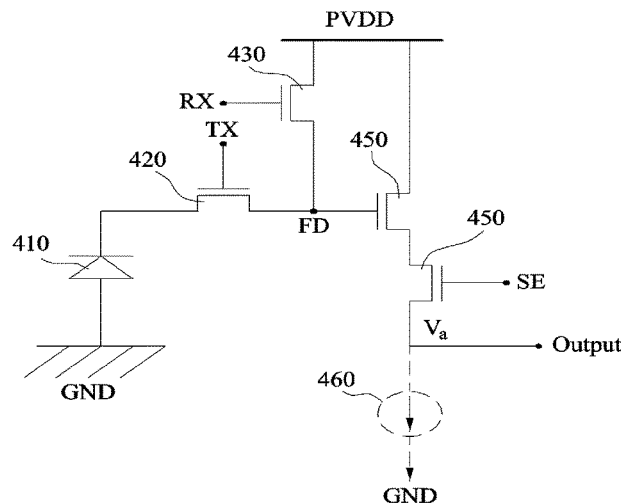
FIG. 11 is a diagram showing an embodiment of a unit pixel of the pixel array shown in FIG. 1.

FIG. 11 is a diagram showing an embodiment of a unit pixel in the pixel array 120 shown in FIG. 1.

Referring to FIG. 11, each of the unit pixels P11 to Pnm of the pixel array 120 may include a photodiode 410, a sense node FD and first to fourth transistors 420 to 450.

For example, the first transistor 420 may be a transfer transistor, the second transistor 430 may be a reset transistor, the third transistor 440 may be a drive transistor and the fourth transistor 450 may be a select transistor. Each of the unit pixels P11 to Pnm may further include a constant current source 460 between the select transistor 450 and a first power supply GND.

The photodiode 410 may be connected between the first power supply (e.g., ground (GND)) and the transfer transistor 420, and may absorb light and generate electrical charges corresponding to the amount of absorbed light.

The transfer transistor 420 may be between the sense node FD and the photodiode 410 and may transmit charges generated by the photodiode 410 to the sense node FD in response to a transmission signal TX. Here, the sense node FD may be a floating diffusion region.

The reset transistor 430 may be between a second power supply PVDD and may reset the unit pixel in response to a reset signal RX.

The drive transistor 440 may be between the second power supply PVDD and one end (e.g., a source or drain terminal) of the select transistor 450, and a gate thereof may be connected to the sense node FD. The drive transistor 440 may output a signal in response to the voltage on the sense node FD, and may be configured as a source follower in combination with the constant current source 450.

The select transistor 450 may be between the drive transistor 440 and the sensing line, and may output a sense signal Va to the output terminal connected to the sensing line in response to a selection signal SE. The sense signal Va may be output on the output terminal in accordance with the sensed charges from the photodiode 410.

Figure 12:
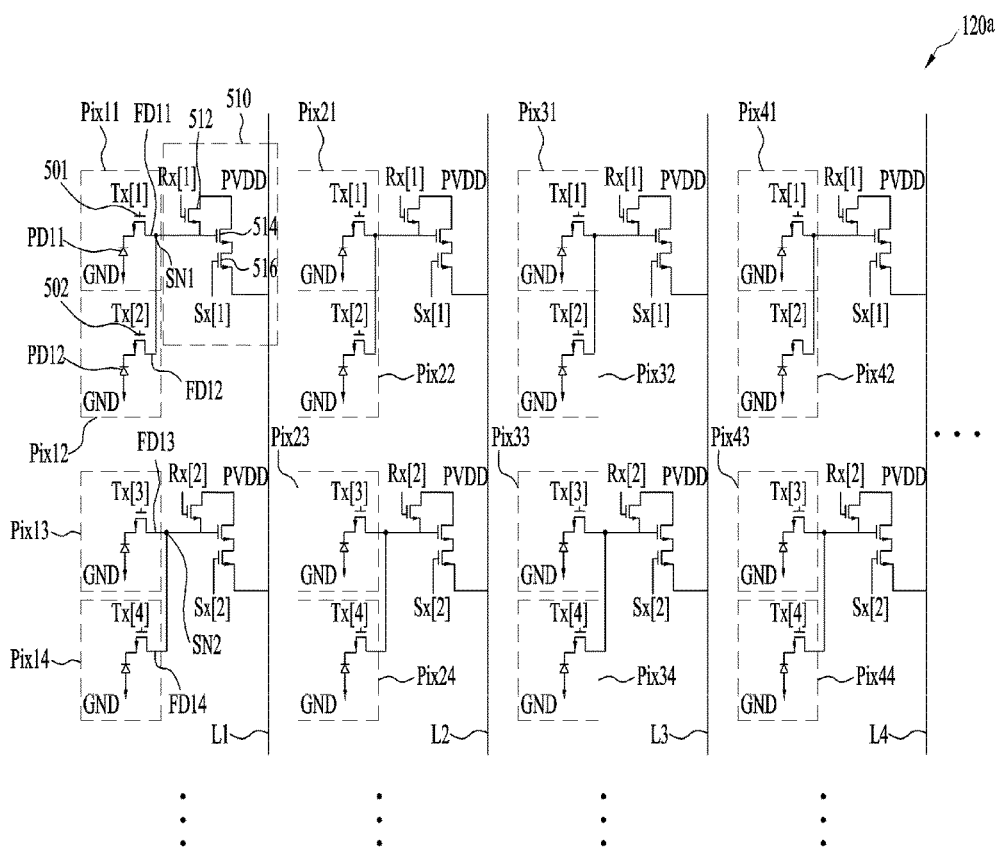
FIG. 12 is a diagram showing another embodiment of the pixel array shown in FIG. 1.

FIG. 12 is a diagram showing another embodiment of the pixel array 120a as shown in FIG. 1.

Referring to FIG. 12, the pixel array 120a includes a plurality of unit pixels (e.g., Pix11 to Pix44) and a readout circuit 510.

The plurality of unit pixels (e.g., Pix11 to Pix44) may be in a matrix including rows and columns. Each of the unit pixels (e.g., Pixx11 to Pix44) may have the same structure.

For example, the unit pixel (e.g., Pix11) may include a photodiode PD11, a floating diffusion area FD11 and a transfer transistor 501 between the photodiode and the floating diffusion area FD11 to transmit charges from the photodiode PD11 to the floating diffusion area FD11.

The floating diffusion areas of two or more different unit pixels in each column of the pixel array 120a are connected to each other. The floating diffusion areas connected to and shared between each other are referred to as "shared sense nodes SN1 and SN2".

That is, the unit pixels in each column may be grouped into a plurality of sub-groups, and each of the plurality of sub-groups may include two or more different unit pixels. The plurality of sub-groups may be sequentially driven.

The floating diffusion areas FD11 and FD12, FD13 and FD14 of the unit pixels in the plurality of sub-groups are connected to and shared between each other.

For example, each of the sub-groups may include two adjacent unit pixels in each column of the pixel array 120a.

The readout circuit 510 connects the shared floating diffusion areas and a corresponding one of the sensing lines.

The readout circuit 510 may include a reset transistor 512, a drive transistor 514 and a select transistor 516.

The reset transistor 512 may be between the second power supply PVDD and the shared sense node to reset the unit pixel in response to a reset signal RX.

The drive transistor 514 may be between the second power supply PVDD and one end (e.g., source or drain) of the select transistor 450 and have a gate connected to the sense node FD.

The select transistor 516 is between the drive transistor 514 and the sensing line to output a sense signal to the sensing line in response to a selection signal SE.

Figure 13A:
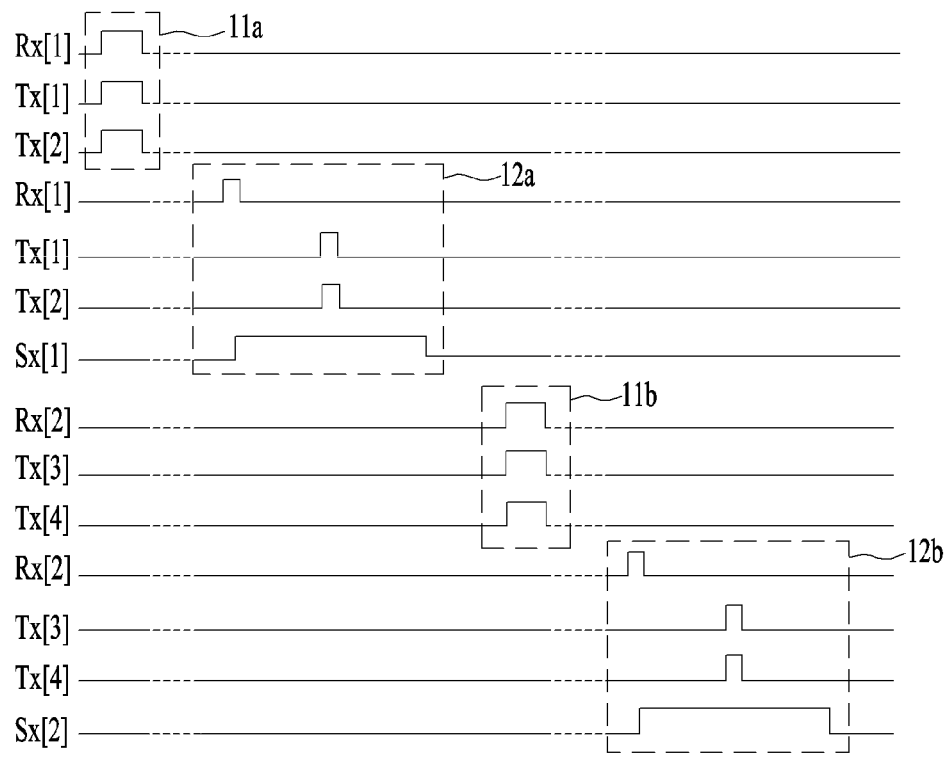
FIG. 13A is a timing diagram showing an operation of the pixel array shown in FIG. 12 in a first driving mode.

FIG. 13A is a timing diagram showing a process or operation of the pixel array 120a as shown in FIG. 12 in a first driving mode. Here, the first driving mode may be a vertical binning mode.

Referring to FIG. 13A, the unit pixels (e.g., Pix11 and Pix12, or Pix13 and Pix14) sharing a shared sense node (e.g., SN1 or SN2) are simultaneously refreshed, as shown by the dashed-line boxes 11a and 11b.

After completing the refresh operation, a CDS sampling process or operation may be performed with reference to the unit pixels (e.g., Pix11 and Pix12, Pix13 and Pix14, etc.) sharing the shared sense node (e.g., SN1 or SN2), as shown by the dashed-line boxes 12a and 12b.

After resetting the reset transistor 512, the transfer transistors (e.g., 501 and 502) of the unit pixels (e.g., Pix11 and Pix12) are simultaneously turned on.

For example, after turning the reset transistor 512 of the readout circuit 510 on in response to the reset signal RX[1], the select transistor 516 may be turned on in response to the selection signal SX[1], and the first and second transfer transistors 501 and 502 may be simultaneously turned on in response to the first and second transmission signals TX[1] and TX[2] when the select transistor 516 is on.

In FIG. 13A, since two rows are simultaneously sensed, embodiments of the image sensor can improve the readout speed of the image sensor. Since two unit pixels share one readout circuit, it may be possible in the same layout area of the pixel array to increase the area of the photodiode, as compared to the single pixel structure of FIG. 11.

The description of the unit pixels Pix11 and Pix12 and/or processes or operations thereof is equally applicable to the refresh process or operation and the CDS sampling process or operation of the unit pixels sharing different shared sense nodes.

Figure 13B:
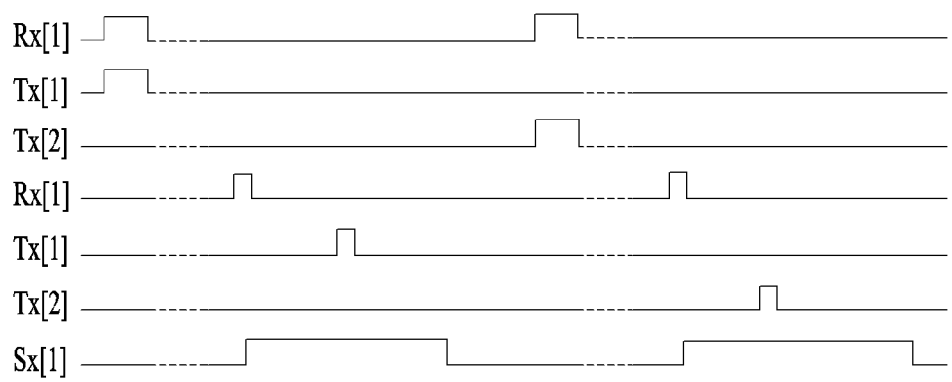
FIG. 13B is a timing diagram showing operation of the pixel array shown in FIG. 12 in a second driving mode.

FIG. 13B is a timing diagram showing a process or operation of the pixel array 120a shown in FIG. 12 in a second driving mode. Here, the second driving mode may be a normal mode without a vertical binning process or operation.

Referring to FIG. 13B, the transfer transistors 501 and 502 of the unit pixels Pix11 and Pix12 in which the floating diffusion areas (e.g., FD11 and FD12) are connected to each other may be sequentially turned on in response to second transmission signals TX[1] and TX[2].

Figure 14:
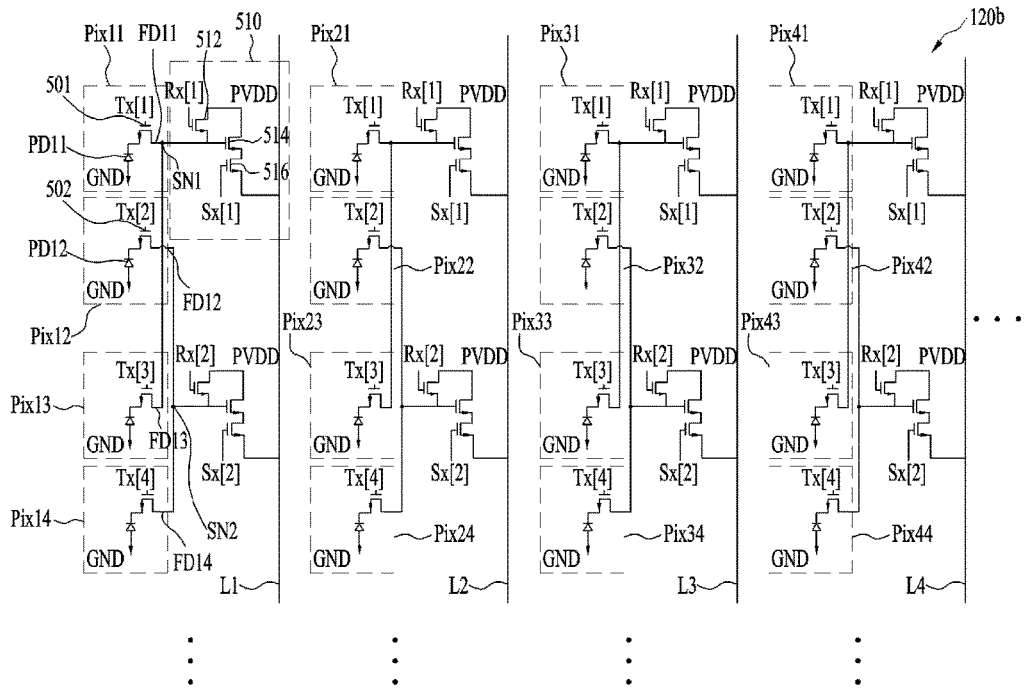
FIG. 14 is a diagram showing another embodiment of the pixel array shown in FIG. 1.

FIG. 14 is a diagram showing another embodiment 120b of the pixel array 120 as shown in FIG. 1. The same reference numerals as in FIG. 12 indicate the same components in FIG. 14, which will be described briefly or omitted.

Referring to FIG. 14, the pixel array 120b includes a plurality of unit pixels (e.g., Pix11 to Pix44) and a readout circuit 510. The configuration or arrangement of the plurality of unit pixels (e.g., in a matrix) is the same or substantially the same as that in FIG. 12.

The unit pixels in each column may be grouped into a plurality of sub-groups, and each of the plurality of sub-groups may include two or more different unit pixels. The plurality of sub-groups may be sequentially driven. The floating diffusion areas FD11 and FD13 or FD12 and FD14 of the unit pixels in given sub-groups are connected to and shared between each other.

For example, the plurality of sub-groups may include first sub-groups and second sub-groups.

Each of the first sub-groups may include unit pixels of two or more different odd-numbered rows of each column, and each of the second sub-groups may include unit pixels of two or more different even-numbered rows of each column.

For example, each of the first sub-groups may include unit pixels of two adjacent odd-numbered rows of each column, and each of the second sub-groups may include unit pixels of two adjacent even-numbered rows of each column.

The floating diffusion areas of the unit pixels in each of the first sub-groups may be connected to and shared between each other and the floating diffusion areas of the unit pixels in each of the second sub-groups may be connected to and shared between each other. The floating diffusion areas connected to and shared between each other may be referred to as "shared sense nodes SN1 and SN2".

The readout circuit 510 may be connected between the shared sense node (e.g., SN1 or SN2) and the sensing line (e.g., L1).

Figure 15A:
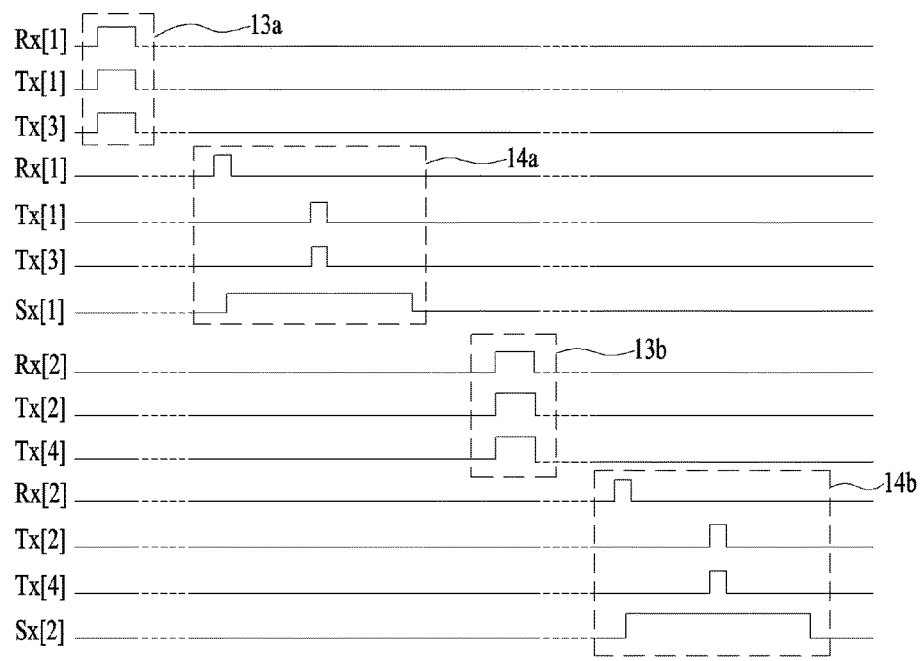
FIG. 15A is a timing diagram showing operation of the pixel array shown in FIG. 14 in a first driving mode.
Figure 15B:
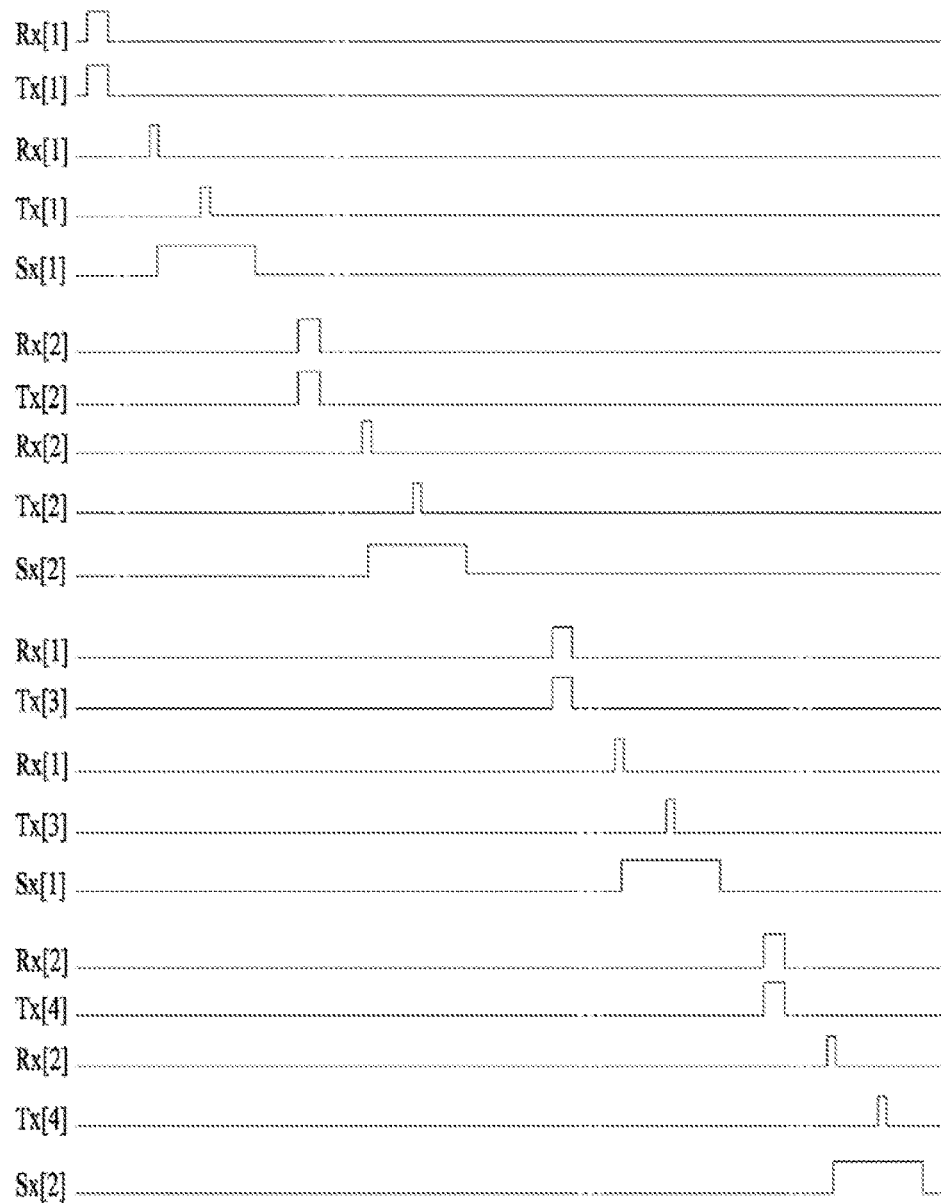
FIG. 15B is a timing diagram showing operation of the pixel array shown in FIG. 14 in a second driving mode.

FIG. 15A is a timing diagram showing an exemplary process or operation of the pixel array 120b shown in FIG. 14 in a first driving mode, and FIG. 15B is a timing diagram showing an exemplary process or operation of the pixel array 120b shown in FIG. 14 in a second driving mode. The first driving mode may be a vertical binning mode, and the second driving mode may be a normal mode.

Referring to FIGS. 15A and 15B, the unit pixels (e.g., Pix11 and Pix13 or Pix12 and Pix14) sharing the shared sense node (e.g., SN1 or SN2) are simultaneously refreshed, as shown by the dashed-line boxes 13a and 13b.

After completing the refresh operation, a CDS sampling process or operation may be performed with reference to the unit pixels (e.g., Pix11 and Pix13, or Pix12 and Pix14) sharing the shared sense node (e.g., SN1 or SN2), as shown by the dashed-line boxes 14a and 14b.

In the first driving mode, the transfer transistors 501 and 503 of the unit pixels Pix11 and Pix13 of the odd-numbered rows are simultaneously turned on in response to the transmission signals TX[1] and TX[3], and the transfer transistors 502 and 504 of the unit pixels Pix12 and Pix14 of the even-numbered rows are simultaneously turned on in response to the transmission signals TX[2] and TX[4].

As described above, according to this embodiment, it may be possible to reduce power consumption of the analog-digital conversion block and to advantageously increase the frame rate of the image sensor.

Figure 16:
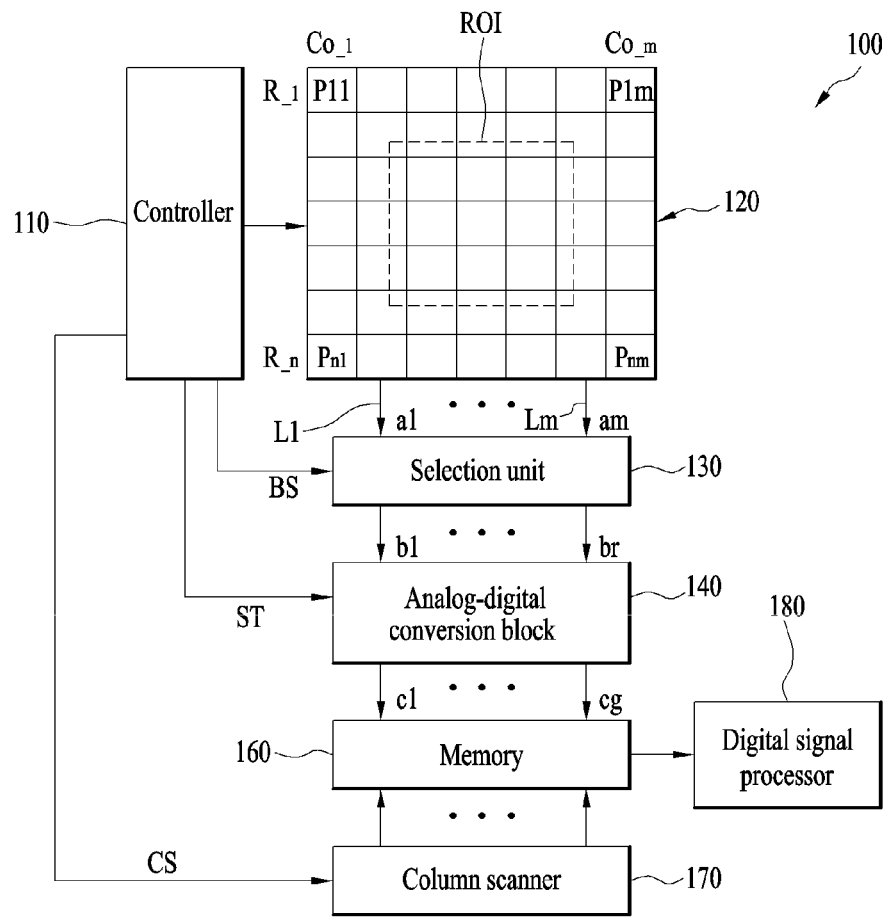
FIG. 16 is a diagram illustrating a region-of-interest operation mode of the image sensor shown in FIG. 1.

FIG. 16 is a diagram illustrating a region-of-interest operation mode of the image sensor 120 shown in FIG. 1. The same reference numerals as in FIG. 1 indicate the same components in FIG. 16, which will be described briefly or omitted.

Referring to FIG. 16, by reading out the region of interest (ROI) of the pixel array 120, it is possible to reduce power consumption and to increase the frame rate of the image sensor. Here, the ROI may be a portion of the pixel array 120, and may have a position and/or a size.

For example, the position of the ROI may be defined by rows and columns of the pixel array 120, and the size may be defined by the length and width of the ROI or the number of pixels in the ROI.

The position and size of the ROI may be programmable or predetermined. For example, the ROI may be set by user input (e.g., a selectable area or value input through a touch sensor).

Figure 17:
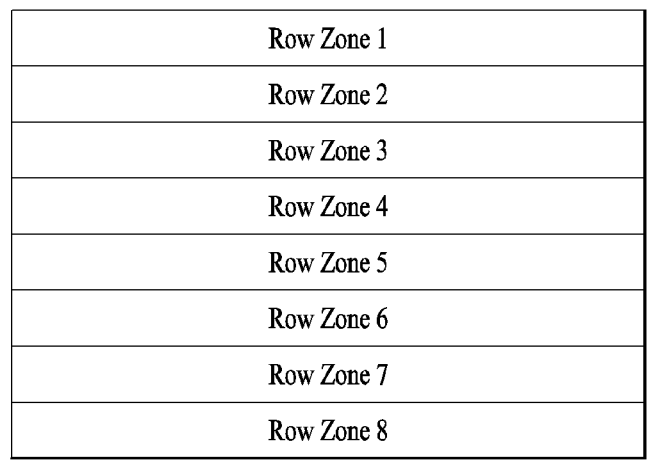
FIG. 17 is a diagram showing an embodiment of the region of interest shown in FIG. 16.

FIG. 17 is a diagram showing an embodiment of the region of interest as shown in FIG. 16. Referring to FIG. 17, the pixel array 120 may comprise or be divided into a plurality of row zones 1 to 8.

Each of the row zones 1 to 8 may include two or more different columns. The columns of the ROI may match or correspond to at least one column of the plurality of row zones.

For example, when the pixel array 120 includes 800 columns, the pixel array 120 may include eight row zones 1 to 8. Each row zone may include 10 different columns, and the ROI may include or be at least one of the eight row zones 1 to 8. In addition, each row zone may include pixels from 1 or more rows of the pixel array 120.

Figure 18:
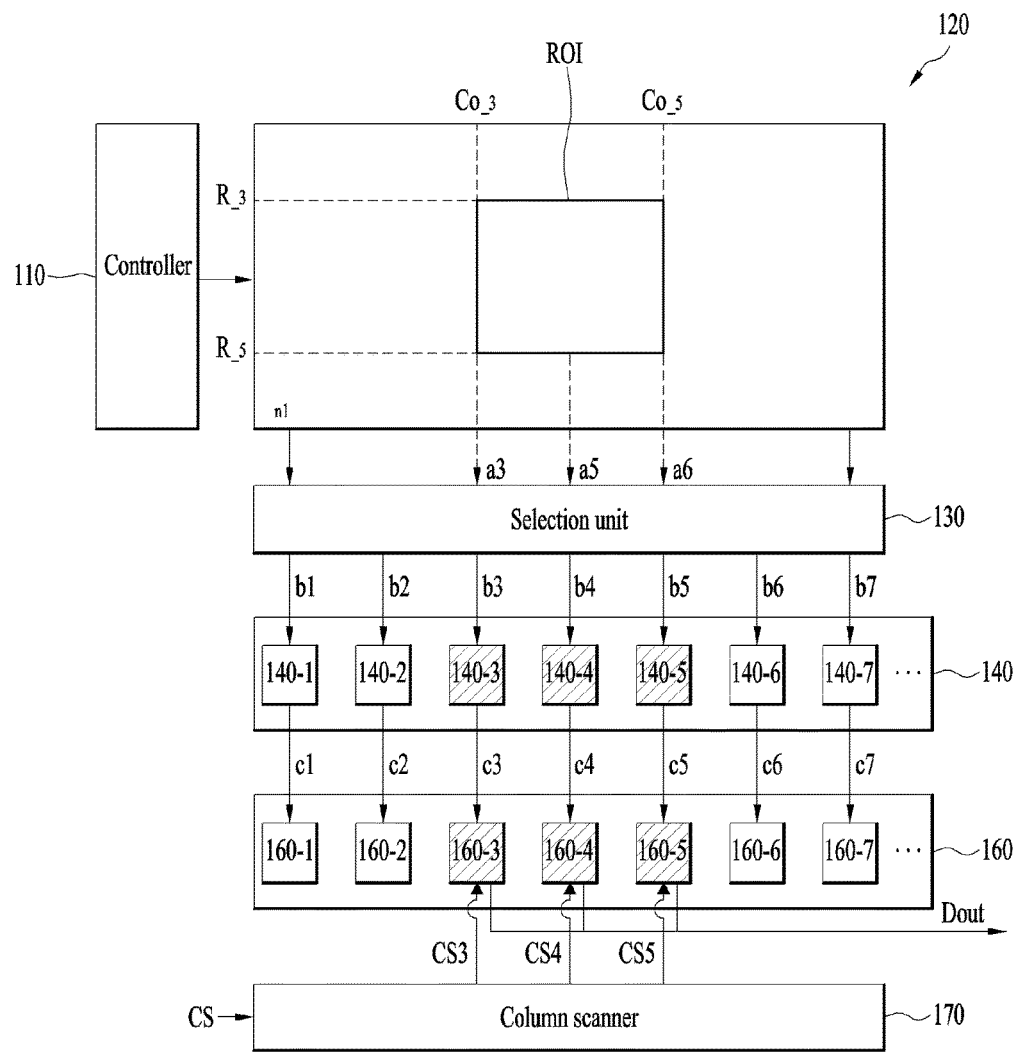
FIG. 18 is a diagram showing an operation of a selection unit, an analog-digital conversion block, a memory and a column scanner configured to perform a region-of-interest operation mode according to an embodiment of the present invention.

FIG. 18 is a diagram showing one or more embodiments of the selection unit 130, the analog-digital conversion block 140, the memory 160 and the column scanner 170, configured to perform a region-of-interest process or operation (e.g., when operating in ROI mode).

Referring to FIG. 18, first, an ROI to be sensed is determined, identified, selected or acquired (e.g., from the pixel array 120). For example, the ROI may be one or more of the row zones, selected by user input.

In FIG. 18, we can assume for example that the ROI includes third to fifth rows R_3 to R_5 and third to fifth columns CO_3 to CO_5 (or, e.g., an intersection thereof).

The controller 110 drives the rows (e.g., R_3 to R_5) of the ROI. The controller 110 may sequentially drive the first row (e.g., R_3) to the last row R_5 in the ROI.

First, the controller 110 may drive the unit pixels in the first row in the ROI.

Next, the selection unit 130 selects only the columns of the ROI from among the columns of the pixel array and outputs the selection output signals.

For example, the selection unit 130 may select outputs (e.g., a3 to a6) corresponding to the columns (e.g., CO_3 to CO_5) of the ROI from among the outputs of the unit pixels in the rows (e.g., R_3 to R_5) of the ROI, and output the selection output signals (e.g., b3 to b5) to the analog-digital conversion block 140.

That is, data from the ROI may be obtained by selective driving of a row zone by the controller 110 and selection of the columns of the pixel array by the selection unit 130.

Next, the analog selection output signals are converted to output digital data using the first analog-digital conversion units corresponding to the selection output signals.

For example, the analog-digital conversion units (e.g., 140-3 to 140-5) corresponding to the columns (e.g., CO_3 to CO_5) of the ROI may be turned on, and the analog-digital conversion units 140-1 to 140-2 and 140-6 to 140-m corresponding to the remaining columns (e.g., CO_1 to CO_2 and CO_6 to CO_m) may be turned off.

All m analog-digital conversion units 140-1 to 140-m do not operate, but rather, only the first analog-digital conversion units (e.g., 140-3 to 140-5) configured to receive the selection output signals (e.g., b3 to b5) and corresponding to the ROI are turned on. The second analog-digital conversion units (i.e., the analog-digital conversion units 140-1 to 140-m other than the first analog-digital conversion units) are turned off. Therefore, according to embodiments of the present image sensor, it is possible to reduce power consumption of the analog-digital conversion block 140.

Next, the memory 160 stores the outputs (e.g., C3 to C5) of the first analog-digital conversion units (e.g., 140-3 to 140-5) selectively operating in correspondence with the ROI.

The outputs of the first analog-digital conversion units (e.g., 140-3 to 140-5) corresponding to the ROI may be stored in the corresponding latches (e.g., 160-3 to 160-5) among the plurality of latches 160-1 to 160-m of the memory 160.

Only the outputs (e.g., C3 to C5) of the first analog-digital conversion units (e.g., 140-3 to 140-5) stored in the memory 160 are read by the control signals CS3 to CS5 of the column scanner 170 and output to the digital signal processor 180.

The column scanner 170 may generate control signals (e.g., CS3 to CS5) configured to selectively read only the outputs (e.g., C3 to C5) of the first analog-digital conversion units (e.g., 140-3 to 140-5) stored in the memory 160.

The column scanner 170 does not read all of the data stored in the plurality of latches 160-1 to 160-m of the memory 160, but sequentially reads only the data stored in the latches (e.g., 160-3 to 160-5) corresponding to the ROI in response to the control signals CS3 to CS5. Therefore, according to embodiments of the image sensor, it is possible to improve the read speed of the data stored in the memory 160 and to shorten the time to scan one row of the pixel array 120. Accordingly, it is possible to increase the frame rate of the image sensor.

Next, the controller 110 drives the unit pixels in the second row in the ROI and reads and outputs only the outputs (e.g., C3 to C5) of the first analog-digital conversion units (e.g., 140-3 to 140-5) corresponding to the second row of the ROI to the digital signal processor 180.

By such a method, an image sensing process or operation is performed on all of the rows of the ROI.

Figure 19:
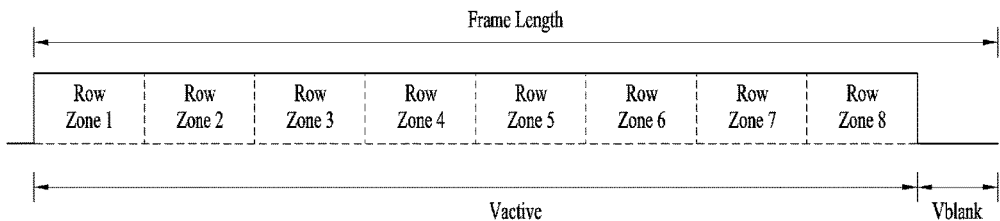
FIG. 19 is a diagram showing the length of one frame of a pixel array including a plurality of row zones.

FIG. 19 is a diagram showing the length of one frame of the pixel array 120 including a plurality of row zones.

Referring to FIG. 19, the length of one frame may include a period Vactive for driving the plurality of row zones and a blank period Vblank for distinguishing between frames.

If the ROI is a second row zone 2, the time for the ROI operational mode may be the time during which only the second row zone 2 is driven. Therefore, it is possible to reduce the time of a sensing process or operation.

Figure 20:
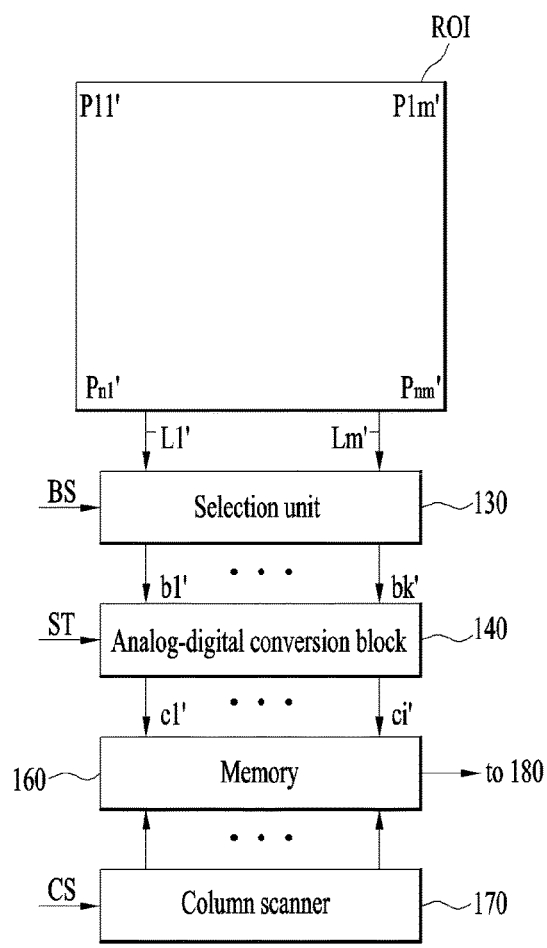
FIG. 20 is a diagram illustrating various operations of the region of interest in FIG. 16.

FIG. 20 is a diagram illustrating various processes or operations involving the region of interest (ROI) in FIG. 16.

Referring to FIG. 20, the ROI may include a plurality of unit pixels P11' to Pnm', and may be a matrix including rows and columns.

The description of FIGS. 3 to 15 is equally applicable to the plurality of unit pixels P11' to Pnm' in the ROI shown in FIG. 20. For example, the embodiment shown in FIG. 16 may be or comprise the monochrome type image sensor shown in FIG. 3. In the monochrome type image sensor, the circuit configuration of the selection unit 130 may be the same as or substantially the same as those shown in FIGS. 9A and 9B.

Alternatively, for example, the embodiment shown in FIG. 16 may be or comprise the Bayer type image sensor shown in FIG. 4. In the Bayer type image sensor, the circuit configuration of the selection unit 130 may be the same as or substantially the same as those shown in FIGS. 10A and 10B.

Figure 21:
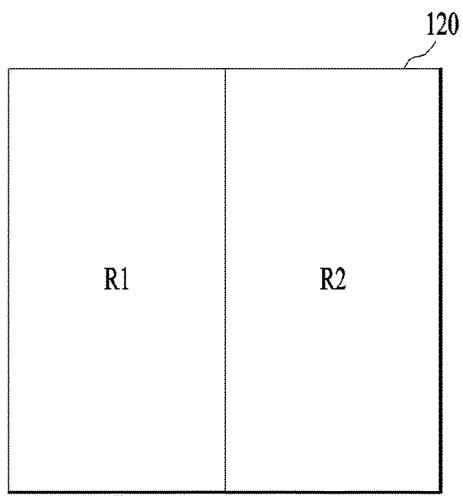
FIG. 21 is a diagram showing a first region and a second region of the pixel array shown in FIG. 16.

FIG. 21 is a diagram showing a first region R1 and a second region R2 of the pixel array 120 shown in FIG. 16. The first and second regions are divided or arranged in the column direction of the pixel array 120. The first region R1 may be a region of interest (ROI), and the second region R2 may be a region other than the ROI (e.g., the remainder) in the pixel array 120.

Figure 22A:
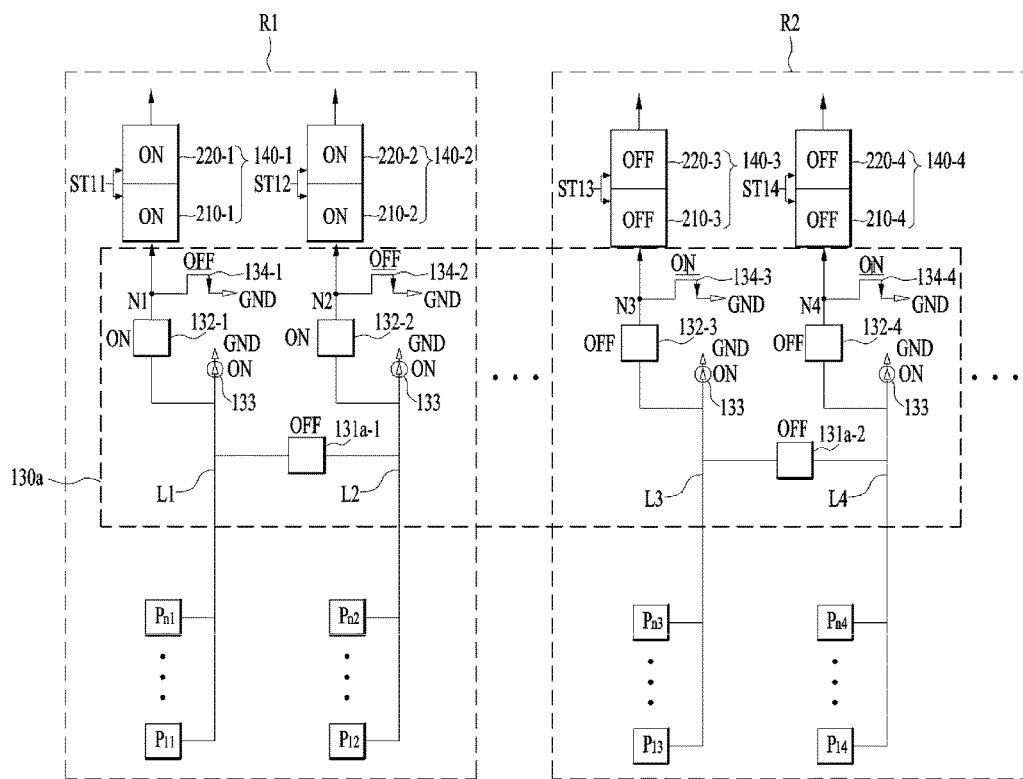
FIG. 22A is a diagram showing an embodiment of an operation of a selection unit and an analog-digital conversion block for a first region and a second region of a monochrome type pixel array.

FIG. 22A is a diagram showing an embodiment of processes or operations of a selection unit 130 and an analog-digital conversion block corresponding to first and second regions R1 and R2 of a monochrome type pixel array 120. FIG. 22A shows a normal mode process or operation without a binning process or operation.

Referring to FIG. 22A, for the normal mode operation, the first switches (e.g., 131a-1 and 131a-2) corresponding to the first and second regions R1 and R2 are all turned off.

The second switches (e.g., 132-1 and 132-2) corresponding to the first region R1 (which is the ROI) and the correlated double sampling units (e.g., 210-1 and 210-2) and the analog-digital converters (e.g., 220-1 and 220-2) of the analog-digital conversion units (e.g., 140-1 and 140-2) corresponding to the first region R1 are all turned on, and the third switches (e.g., 134-1 and 134-2) corresponding to the first region R1 are all turned off.

In contrast, the second switches (e.g., 132-3 and 132-4), the correlated double sampling units (e.g., 210-3 and 210-4) and the analog-digital converters (e.g., 220-3 and 220-4) of the analog-digital conversion units (e.g., 140-3 and 140-4) corresponding to the second region R2 are all turned off, and the third switches (e.g., 134-3 and 134-4) corresponding to the second region R2 are all turned on.

Figure 22B:
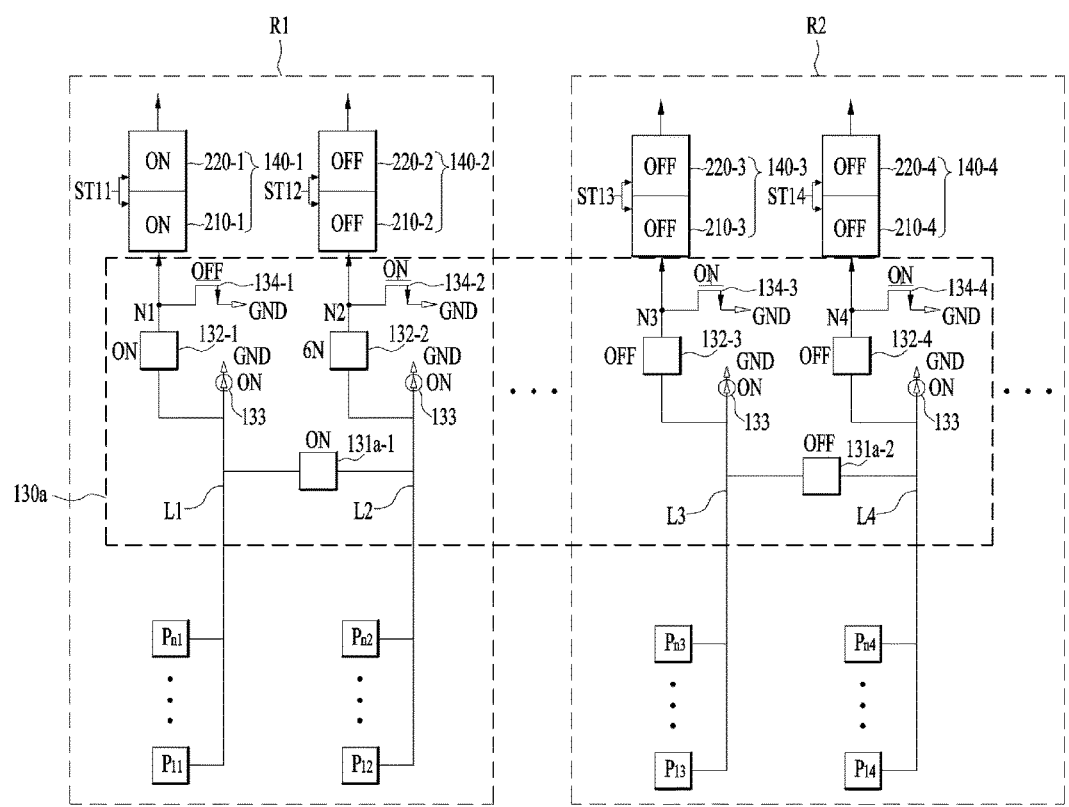
FIG. 22B is a diagram showing another embodiment of operation of a selection unit and an analog-digital conversion block configured to a first region and a second region of a monochrome type pixel array.

FIG. 22B is a diagram showing another embodiment of processes or operations of a selection unit and an analog-digital conversion block configured to a first region R1 and a second region R2 of a monochrome type pixel array 120. FIG. 22B shows a binning mode process or operation.

Referring to FIG. 22B, the horizontal binning process or operation described with reference to FIG. 9A is equally applicable to the binning mode process or operation involving the first region R1.

The description of the skipping process or operation of FIG. 9B is equally applicable to the skipping process or operation involving the first region R1.

Upon the binning process or operation or skipping process or operation involving the first region R1, the same process or operation as the normal mode process or operation involving the second region R2 as described with reference to FIG. 22A may continue to be performed with respect to the second region R2 in order to reduce power consumption and increase the frame rate of the image sensor.

In addition, in the case of the Bayer type pixel array (see FIG. 10A), in the normal mode process or operation, the first switches corresponding to the first and second regions R1 and R2 are all turned off, the second switches, the correlated double sampling units, and the analog-digital converters corresponding to the first region R1 are all turned on, and the third switches corresponding to the first region R1 are all turned off. The second switches, the correlated double sampling units and the analog-digital converters corresponding to the second region R2 are all turned off, and the third switches corresponding to the second region R2 are all turned on.

In the case of the Bayer type pixel array, the description of FIG. 10A is equally applicable to the horizontal binning process or operation involving the first region R1. The description of FIG. 10B is equally applicable to the skipping process or operation involving the first region R1. Upon the horizontal binning process or operation or the skipping process or operation involving the first region R1, the normal mode process or operation involving the Bayer type pixel array may be performed with respect to the second region R2.

The description of the vertical binning process or operation of FIGS. 12 to 15B is equally applicable to the vertical binning process or operation involving the ROI.

For example, the ROI may comprise or be divided into a plurality of groups. Each of the plurality of groups may include two or more different columns, and the selection unit may select the outputs of the columns in each of the plurality of groups and output selection output signals corresponding to the selected column outputs.

Each of the plurality of groups may include two or more adjacent columns of the ROI.

In another embodiment, the plurality of groups includes first groups and second groups. Each of the first groups may include two or more adjacent odd-numbered columns among the odd-numbered columns of the ROI, and each of the second groups may include two or more adjacent even-numbered columns among the even-numbered columns of the ROI.

By the horizontal binning process or operation or the vertical binning process or operation involving the unit pixels in the ROI, only the first analog-digital conversion units corresponding to the unit pixels of the ROI selected for the binning process or operation are turned on, and the second analog-digital conversion units of the ROI that are not selected for the binning process or operation are turned off. Accordingly, according to embodiments of the image sensor, it is possible to further reduce power consumption of the analog-digital conversion block.

In addition, since only the digital data stored in the latches of the memory 160 corresponding to the first analog-digital conversion units and the unit pixels of the ROI selected for the binning process or operation is read, it is possible to further improve the read speed of the data stored in the memory 160 and to shorten the time to scan one row of the pixel array 120.

Features, structures, effects, and the like as described in the above embodiments are in at least one embodiment of the present invention and should not be limited to only one embodiment. In addition, the features, structures, effects, and the like described in the respective embodiments may be combined or modified even with respect to the other embodiments by those skilled in the art. Accordingly, contents related to these combinations and modifications should be construed as within the scope of the present invention.

What is claimed is:

1. An image sensor comprising:
a pixel array including a plurality of sensing lines and a plurality of unit pixels in a matrix including rows and columns, wherein each of the sensing lines is connected to ones of the unit pixels in a corresponding column of the pixel array;
a controller configured to (i) set a region of interest (ROI) including first ones of the rows and first ones of the columns of the matrix and (ii) drive the first ones of the rows of the ROI, wherein the ROI comprises a plurality of groups, and each of the plurality of groups includes a plurality of the first ones of the columns;
a selector configured to select one or more of the first ones of the columns of the ROI and output selection output signals for the selected one or more of the first ones of the columns;
a first plurality of analog-digital converters corresponding to the first ones of the columns of the ROI, configured to convert the selection output signals for the selected one or more of the first ones of the columns;
a second plurality of analog-digital converters corresponding to remaining ones of the first columns other than the selected one or more of the first one of the columns of the ROI;
a third plurality of analog-digital converters corresponding to second ones of the columns of the pixel array;
a correlated double sampler corresponding to each of the first, second and third pluralities of analog-digital converters, each correlated double sampler configured to perform correlated double sampling, and each of the first, second and third pluralities of analog-digital converters configured to convert an output of the corresponding correlated double sampler;
a latch unit including first latches configured to store outputs of the first plurality of analog-digital converters and second latches configured to store outputs of the second plurality of analog-digital converters; and
a column scanner configured to select the first latches and read data stored in the selected first latches,
wherein the third plurality of analog-digital converters and the correlated double samplers corresponding to the third plurality of analog-digital converters are off when the second plurality of analog-digital converters convert the outputs of the corresponding correlated double samplers.

2. The image sensor according to claim 1, wherein:
the pixel array includes a plurality of row zones,
each of the plurality of row zones includes two or more different columns, and
the columns of the ROI match at least one column of the plurality of row zones.

3. The image sensor according to claim 1, wherein:
the selector selects outputs of the first columns in each of the plurality of groups and outputs the selection output signals.

4. The image sensor according to claim 3, wherein each of the plurality of groups includes two or more adjacent first columns of the ROI.

5. The image sensor according to claim 3, wherein:
the plurality of groups includes first groups and second groups, and
each of the first groups includes two or more adjacent odd-numbered columns, and each of the second groups includes two or more adjacent even-numbered columns.

6. The image sensor according to claim 3, wherein:
each of the sensing lines is connected to unit pixels in a corresponding one of the columns of the pixel array.

7. The image sensor according to claim 6, wherein the selector includes:
first switches configured to connect sensing lines corresponding to first columns in each of the plurality of groups; and
second switches between the sensing lines and the first analog-digital converters.

8. The image sensor according to claim 7, wherein the selector further includes third switches between a ground voltage or a ground potential and connection nodes between the sensing lines and the first analog-digital converters.

9. The image sensor according to claim 7, wherein each of the first switches is between two different and adjacent ones of the sensing lines.

10. The image sensor according to claim 1, wherein the selection output signals are a sum or an average of the unit pixels in the selected one or more of the first ones of the columns.

11. The image sensor according to claim 1, wherein the selection output signals are not supplied to the second plurality of analog-digital converters.

12. The image sensor according to claim 1, wherein the first latches comprise:
third latches corresponding to the first plurality of analog-digital converters and configured to store outputs of the first plurality of analog-digital converters; and
fourth latches corresponding to the third plurality of analog-digital converters;
wherein the column scanner is configured to read data from the third latches.

* * * * *